United States Patent
Ganeshan et al.

(10) Patent No.: US 8,427,366 B2
(45) Date of Patent: Apr. 23, 2013

(54) DUAL FREQUENCY RECEIVER WITH SINGLE I/Q IF PAIR AND MIXER

(75) Inventors: Saravana Kumar Ganeshan, Bangalore (IN); Bijoy Bhukania, Bangalore (IN); Anand Kannan, Bangalore (IN)

(73) Assignee: Texas Instruments Incorporated, Dallas, TX (US)

(*) Notice: Subject to any disclaimer, the term of this patent is extended or adjusted under 35 U.S.C. 154(b) by 211 days.

(21) Appl. No.: 12/897,039

(22) Filed: Oct. 4, 2010

(65) Prior Publication Data
US 2012/0026039 A1   Feb. 2, 2012

(30) Foreign Application Priority Data
Jul. 27, 2010   (IN) ............ 2131/CHE/2010

(51) Int. Cl.
*G01S 19/33* (2010.01)
*G01S 19/09* (2010.01)

(52) U.S. Cl.
USPC ..................... 342/357.46; 342/357.73

(58) Field of Classification Search ............ 342/357.46, 342/357.51, 357.73, 357.77; 375/340
See application file for complete search history.

(56) References Cited

U.S. PATENT DOCUMENTS

| | | |
|---|---|---|
| 2005/0276316 A1 | 12/2005 | Rabaeijs et al. |
| 2006/0133548 A1 | 6/2006 | Oh et al. |
| 2006/0222058 A1 | 10/2006 | Simic et al. |
| 2007/0104299 A1 | 5/2007 | Cahn et al. |
| 2008/0037687 A1 | 2/2008 | Li et al. |
| 2008/0122674 A1 | 5/2008 | Tan et al. |
| 2009/0054075 A1 | 2/2009 | Boejer et al. |
| 2009/0072899 A1 | 3/2009 | Cho et al. |
| 2009/0103655 A1 | 4/2009 | Arnold |
| 2009/0168843 A1 | 7/2009 | Waters et al. |
| 2010/0067622 A1 | 3/2010 | Komaili et al. |
| 2010/0099351 A1 | 4/2010 | Liu et al. |
| 2010/0141519 A1 | 6/2010 | Rodal |
| 2010/0182179 A1 | 7/2010 | Chou |
| 2010/0203827 A1 | 8/2010 | Abraham |
| 2010/0215125 A1 | 8/2010 | Furman |
| 2011/0103432 A1 | 5/2011 | Tangudu et al. |
| 2011/0187596 A1 | 8/2011 | Rao et al. |
| 2012/0032846 A1 | 2/2012 | Zhao et al. |

*Primary Examiner* — Dao Phan
(74) *Attorney, Agent, or Firm* — Lawrence J. Bassuk; W. James Brady; Frederick J. Telecky, Jr.

(57) ABSTRACT

A wireless receiver for multiple frequency bands reception includes a single receive radio frequency (RF) circuit (160, 170) having an RF bandpass substantially confined to encompass at least two non-overlapped such frequency bands at RF, a single in-phase and quadrature (approximately I, Q) pair of intermediate frequency (IF) sections (120I, 120Q) having an IF passband, and a mixer circuit (110) including an in-phase and quadrature (I,Q) pair of mixers (110I, 110Q) fed by said RF circuit (160, 170) and having a local oscillator (100) with in-phase and quadrature outputs coupled to said mixers (110I, 110Q) respectively, said mixer circuit (110) operable to inject and substantially overlap the at least two non-overlapped frequency bands with each other into the IQ IF sections (120I, 120Q) in the IF passband, the IF passband substantially confined to a bandwidth encompassing the thereby-overlapped frequency bands.

26 Claims, 14 Drawing Sheets

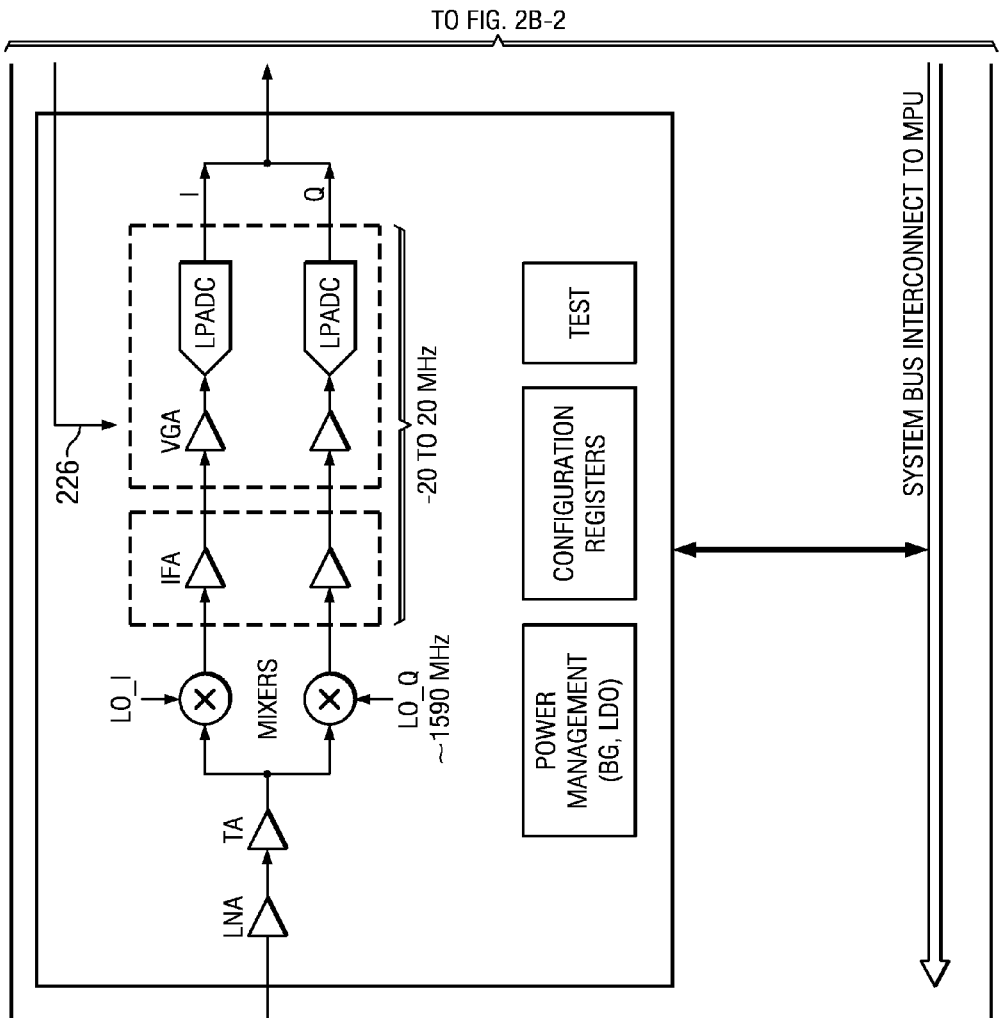
*FIG. 2B-1*
*FIG. 2B*

DUAL FREQUENCY RECEIVER WITH SINGLE I/Q IF PAIR AND MIXER

CROSS-REFERENCES TO RELATED APPLICATIONS

This application is related to provisional India Patent Application "Single RF Receiver Chain Architecture for GPS, Galileo and Glonass Navigation Systems, and Other Circuits, Systems and Processes" 2131/CHE/2010, filed Jul. 27, 2010, for which priority is claimed under 35 U.S.C. 119 and all other applicable law, and which is incorporated herein by reference in its entirety.

This application is related to U.S. Published Patent Application 20090054075, Feb. 26, 2009, "Satellite (GPS) Assisted Clock Apparatus, Circuits, Systems and Processes for Cellular Terminals on Asynchronous Networks," of Ser. No. 11/844,006, filed Aug. 3, 2007, which is incorporated by reference herein in its entirety.

This application is related to U.S. patent application "Enhanced Cross Correlation Detection or Mitigation Circuits, Processes, Devices, Receivers and Systems" Ser. No. 12/719,965, filed Mar. 9, 2010, which is hereby incorporated herein by reference in its entirety.

This application is related to U.S. patent application "Receivers, Circuits, and Methods to Improve GNSS Time-to-Fix and Other Performances" Ser. No. 12/726,611, filed Mar. 18, 2010, which is hereby incorporated herein by reference in its entirety.

STATEMENT REGARDING FEDERALLY SPONSORED RESEARCH OR DEVELOPMENT

Not applicable.

COPYRIGHT NOTIFICATION

Portions of this patent application contain materials that are subject to copyright protection. The copyright owner has no objection to the facsimile reproduction by anyone of the patent document, or the patent disclosure, as it appears in the United States Patent and Trademark Office, but otherwise reserves all copyright rights whatsoever.

BACKGROUND

GPS (Global Positioning System), Galileo, and Glonass (GLNS) are examples of earth-satellite-based electronic systems for enabling satellite receivers in ships, aircraft, land vehicles, mobile devices, and land stations to determine time and their geographic and spatial position such as in latitude, longitude, and altitude. These and other GNSS (global navigation satellite systems in general) exist or will exist. Discussion of particular GNSS herein is without limitation to other GNSS and other analogous electronic systems as well as applicable receiver circuits in a variety of telecommunication systems.

It would be desirable to even more accurately, reliably, rapidly, conveniently and economically maintain accurate time, position, velocity, and/or acceleration estimation in a communication device having a satellite positioning receiver (SPR) or other receiver and its clock source.

Availability of more GLNS satellites and upcoming Galileo satellites is driving interest in using them to further improve urban canyon reception. Large numbers of end-users reside in or work in areas with urban canyons so that the public importance and commercial importance of multiple-GNSS reception is high.

Past technology to support GPS, Galileo and Glonass has employed dual RF chains to support multiband RF. GPS and Galileo both lie in a band from about 1573-1577 MHz, and Glonass is in a band from about 1597-1606 MHz. Dual RF chains are likely to be double in terms of area and power, which is problematic and may diminish the attractiveness of a product to potential customers.

One approach might provide a local oscillator LO1 at 1579 MHz to a first RF chain having 2-6 MHz passband for GPS/Galileo and a second oscillator LO2 at 1596 MHz to a second RF chain having 2-11 MHz passband for Glonass.

Another approach might provide a local oscillator LO at 1579 MHz to a first RF chain having 2-6 MHz passband for GPS/Galileo, and apply the LO to a second RF chain having bandpass filter with 19-28 MHz passband for Glonass.

Using technology as above, even if a low-noise amplifier (LNA) were shared, increases chip and system cost to include or enable Glonass, for instance, in a GPS navigation product, which impedes adoption of such technology.

Some ways of solving these problems and others would be most desirable in this art.

SUMMARY OF THE INVENTION

Generally, and in one form of the invention, a wireless receiver for multiple frequency bands reception includes a single receive radio frequency (RF) circuit having an RF bandpass substantially confined to encompass at least two non-overlapped such frequency bands at RF, a single in-phase and quadrature (approximately I, Q) pair of intermediate frequency (IF) sections having an IF passband, and a mixer circuit including an in-phase and quadrature (I,Q) pair of mixers fed by the RF circuit and having a local oscillator with in-phase and quadrature outputs coupled to the mixers respectively, the mixer circuit operable to inject and substantially overlap the at least two non-overlapped frequency bands with each other into the IQ IF sections in the IF passband, the IF passband substantially confined to a bandwidth encompassing the thereby-overlapped frequency bands.

Generally, and in another form of the invention, a satellite receiver for multiple global navigation satellite systems (GNSS) includes a single receive radio frequency (RF) circuit having an RF bandpass substantially confined to encompass at least two GNSS at RF, a single in-phase and quadrature (IQ) pair of intermediate frequency (IF) sections having an IF passband, and a mixer circuit including an in-phase and quadrature (IQ) pair of mixers fed by the RF circuit and having a local oscillator with in-phase and quadrature outputs coupled to the mixers respectively, the mixer circuit operable to inject and substantially overlap two non-overlapped GNSS with each other into the IQ IF sections in the IF passband, the IF passband substantially confined to a bandwidth encompassing the thereby-overlapped GNSS.

Generally, a further form of the invention involves an electronic circuit for separating frequency-overlapped GLONASS and GPS overlapped in an approximately 20 MHz passband, and the circuit includes a multiple-path analog-to-digital converter circuit (ADC), a sampling rate circuit coupled to concurrently operate the analog-to-digital converter circuit at a sampling rate between about 60 Msps and about 80 Msps, and a digital processing circuit including storage defining complex de-rotation and low pass filtering, the digital processing circuit fed by the analog-to-digital converter circuit and operable A) to establish an access rate and respective distinct phase increments for the complex de-rotation, and B) to execute the complex de-rotation by combinations of trigonometric multiplications using the distinct phase increments approximately concurrently and C) to execute the low pass filtering on the complex de-rotation resulting at the access rate and respective distinct phase increments, whereby to deliver GPS and Glonass signals separated from each other.

Generally, one process form of the invention involves a process of operating a wireless receiver for multiple frequency bands reception, the process including substantially confining an RF bandpass to encompass at least two non-overlapped such frequency bands at RF, injecting and substantially overlapping the at least two non-overlapped frequency bands with each other into an in-phase and in-quadrature IF passband, and confining the IF passband to encompass the thereby-overlapped frequency bands.

Other receivers, circuits, devices, systems and processes are also disclosed and claimed.

BRIEF DESCRIPTION OF THE DRAWINGS

FIG. 3B is a partially-block, partially-schematic diagram.

FIGS. 7A and 7B are portions of a composite partially-block, partially-flow diagram detailing an inventive multiple GNSS reception process and structure in the inventive electronic circuit of FIG. 4 and inventive system of FIG. 2B, wherein FIG. 7A shows a Glonass-related flow portion and FIG. 7B shows a GPS-related flow portion, both using a shared programmable complex de-rotation module such as of FIG. 8.

Figure 1:
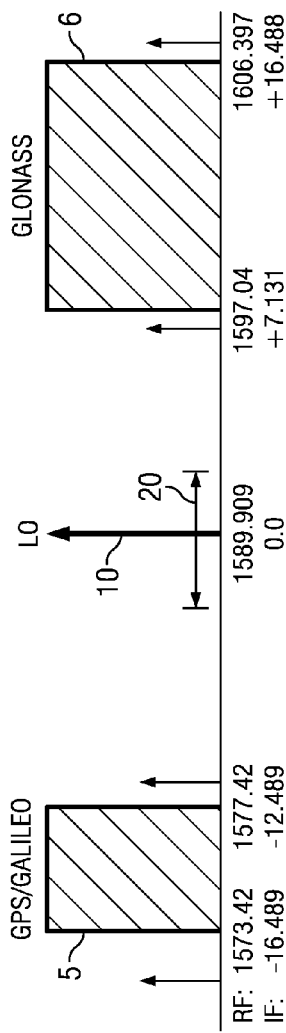
FIG. 1 is a frequency spectrum diagram of different GNSS along with various local oscillator frequency plans.

Corresponding numerals in different Figures indicate corresponding parts except where the context indicates otherwise. A minor variation in capitalization or punctuation for the same thing does not necessarily indicate a different thing. A suffix .i or .j refers to any of several numerically suffixed elements having the same prefix.

DETAILED DESCRIPTION OF EMBODIMENTS

Some embodiments herein solve these problems and differentiate from prior art by introducing a single receive RF chain encompassing all of GPS, Galileo and Glonass at RF without significant image rejection with respect to heterodyning by a single LO situated in frequency between them, and followed by a single low power wide band IF encompassing all of GPS, Galileo and Glonass at IF, and further followed by software-based, hardware-based, or mixed digital signal processing to separate GPS, Galileo and Glonass in the IF from each other. Subsequent processing demodulates the information in respective satellite signals from any selected one, two or all of the GNSS either in parallel or consecutively, and electronically delivers time, position, velocity, and/or acceleration estimation and executes any other desired estimations and applications.

Changes are made in some embodiments to a conventional approach with multiple signal chains as follows:
1) Eliminate all but one signal chain.
2) Single, approximately centered LO frequency between the GNSS bands
3) Wide bandwidth IFA
4) Quadrature wideband ADC carrying multiple GNSS
5) Complex de-rotation and LPF digitally separates multiple GNSS.

Changes are structurally made in the IFA and VGA and LPADC to increase the IF passband width. IFA and VGA op-amp are both made to have higher bandwidth, while consuming less power. LPADC is provided as a low-resolution pipeline ADC that provides wider bandwidth compared to some forms of sigma-delta ADC architecture.

TABLE 1 provides a Glossary in alphabetical order for some of the terms used.

TABLE 1

| GLOSSARY | |
| --- | --- |
| BOC | Binary Offset Carrier modulation multiplies by a rectangular subcarrier with frequency at least as much as the chipping rate. BPSK has signal power is concentrated near the carrier frequency, while BOC separates splits power spectrum and moves it more away from the carrier frequency. |
| BPSK | Binary Phase Shift Keying. |
| CIC | Cascaded Integrator-Comb filter (e.g., organized as n cascaded accumulations, decimation or interpolation by n, then n cascaded differences) |
| Complex | Electronic signal or operation representing a complex number, i.e. a real number plus an imaginary number. |

TABLE 1-continued

GLOSSARY

| | |
|---|---|
| DC | Zero frequency. DC derives from the phrase Direct Current. |
| De-rotation | Adding or subtracting a frequency to a signal frequency. In some examples herein, mixing or heterodyning connotes analog circuits, while de-rotation connotes digital processing to do a similar process. Complex de-rotation is employed herein to reject image signals. |
| Droop | CIC response declines with increasing frequency. A droop correction filter is put after the CIC filter, and has a response that increases with increasing frequency to approximately cancel the droop in the CIC output and thereby deliver a comb-like frequency response overall. |
| DSP | Digital Signal Processor (-ing), electronically performs operations corresponding to communications signal processing equations. DSP can do its own mixing, filtering, correlation, slicing, etc. Programmable DSP is processor(s) that executes software or firmware instructions. Dedicated hardware may do some of the signal processing. |
| FDM | Frequency Division Multiplex used in Glonass. Different Glonass satellites send their satellite data in different RF sub-bands in a Glonass frequency band. |
| FW | Firmware |
| Galileo | Satellite positioning system, European-originated. Uses BOC. |
| GLNS | Glonass satellite positioning system, Russian-originated |
| GNSS | General abbreviation for any global navigation satellite system. |
| GPS | Global Positioning System, USA-originated. |
| HBF | Half Band Filter |
| HW | Hardware |
| I, Q | In-Phase, Quadrature. IQ is a pair of signals that are same except for 90 degrees phase difference. |
| IF | Intermediate Frequency, result of heterodyning from RF to a lower frequency passband called IF, by applying LO to RF in a mixer. |
| IFA | Intermediate Frequency Amplifier |
| IQMC | IQ mismatch compensation |
| LNA | Low Noise Amplifier |
| LO | Local Oscillator. An LO-I and LO-Q are 90 degrees out of phase. |
| LPADC | Low Power Analog to Digital Converter: |
| LPF | Low Pass Filter, passes frequencies below a cutoff frequency. |
| m.n | m integer bits and n fractional bits in twos complement representation for use in binary arithmetic. |
| 1.m.n | 1 sign bit, m integer bits and n fractional bits in signed representation for use in binary arithmetic. |
| ↓ n | Decimation by n, i.e. sample rate reduction by n, or passing each nth sample. Usually a whole number is put by the down-arrow. |
| PA | Power Amplifier. Final RF amplifier for RF transmitter. |
| PHY | Physical layer interface. |
| PN | Pseudonoise. Pulse train of 1's and 0's resembling randomness. Different PN pulse trains are modulated with satellite data and sent as the different GPS satellite signals and different Galileo satellite signals. |
| RC | Resistance-Capacitance, used to establish filter properties. |
| Re-sampler | Converts input at one sample rate to output at another sample rate. |
| RF | Radio Frequency. Also, highest frequency stage(s) at front end of wireless receiver. |
| SAW | Surface Acoustic Wave bandpass filter used ahead of RF section. |
| sps | Samples per second. Msps is million (or mega) samples per second. |
| SW | Software |
| TA | Transconductance amplifier |
| VGA | Variable Gain Amplifier, controlled by AGC (automatic gain control). |

In FIG. 1, GPS and Galileo both lie in an RF band from about 1573-1577 MHz, and Glonass is in an RF band from about 1597-1606 MHz, as indicated by the respective shaded bands for GPS/Galileo 5 and Glonass 6 and the enumerated frequencies in a row "RF:". One type of embodiment has a single local oscillator (LO) 100 of FIG. 2A that has an LO frequency 10 established at about 1590 MHz, roughly midway between at least one higher frequency GNSS (e.g., Glonass) and at least one lower frequency GNSS (e.g., GPS and/or Galileo).

Figure 2A:
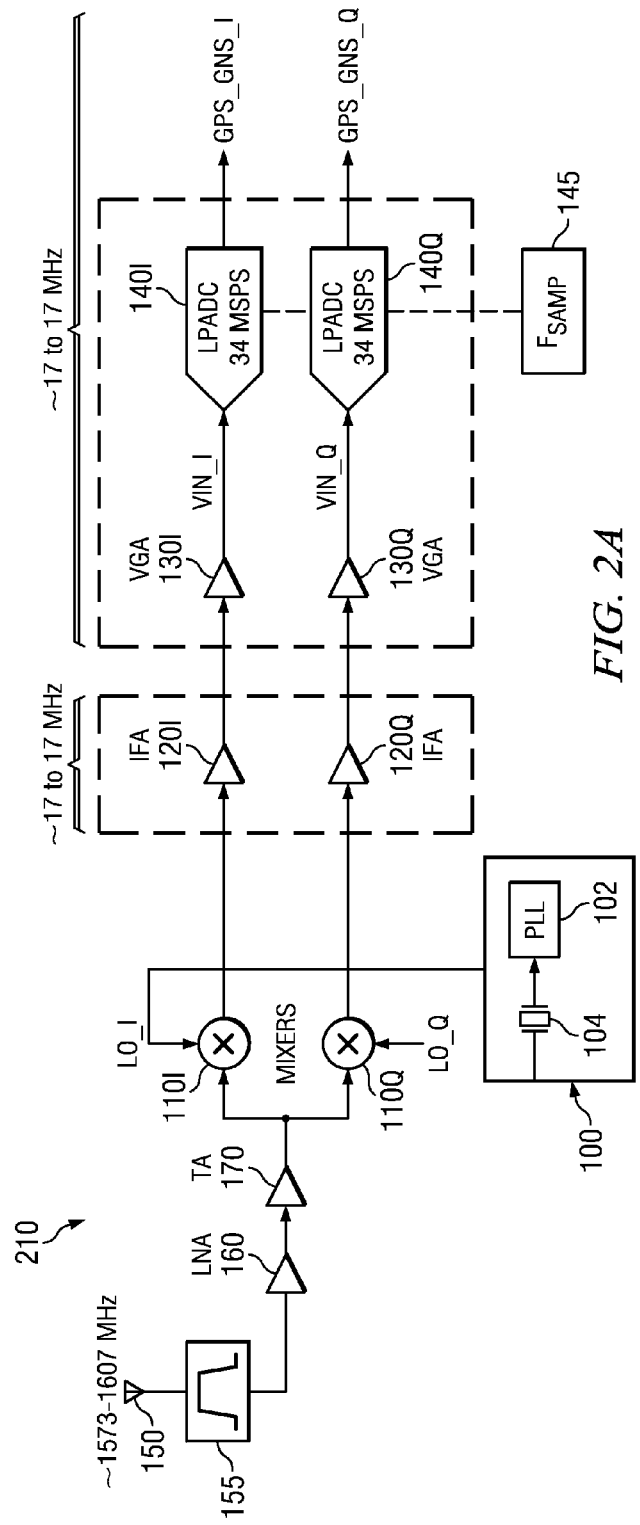
FIG. 2A is a block diagram of an inventive unified receiver front-end for multiple GNSS as depicted in FIG. 1.

In FIG. 2A, a single in-phase/quadrature I/Q mixer-pair 110I, 110Q acts as an analog down-converter, which is excited in quadrature by LO 100, and is fed by a single RF section with antenna 150, SAW bandpass filter 155, low noise amplifier LNA 160, and transconductance amplifier TA 170. The bandwidth of the RF section encompasses the plural GNSS's of interest and substantially no image rejection is introduced in the RF section with respect to heterodyning by the single LO 100 situated in frequency 10 between the GNSS's at the high end and low end of the RF section passband. Put another way, received frequencies like 5 and 6 equidistant from the LO frequency 10 and within the SAW 155 passband are both heterodyned into the IF bandwidth.

Figures 2, 2B:
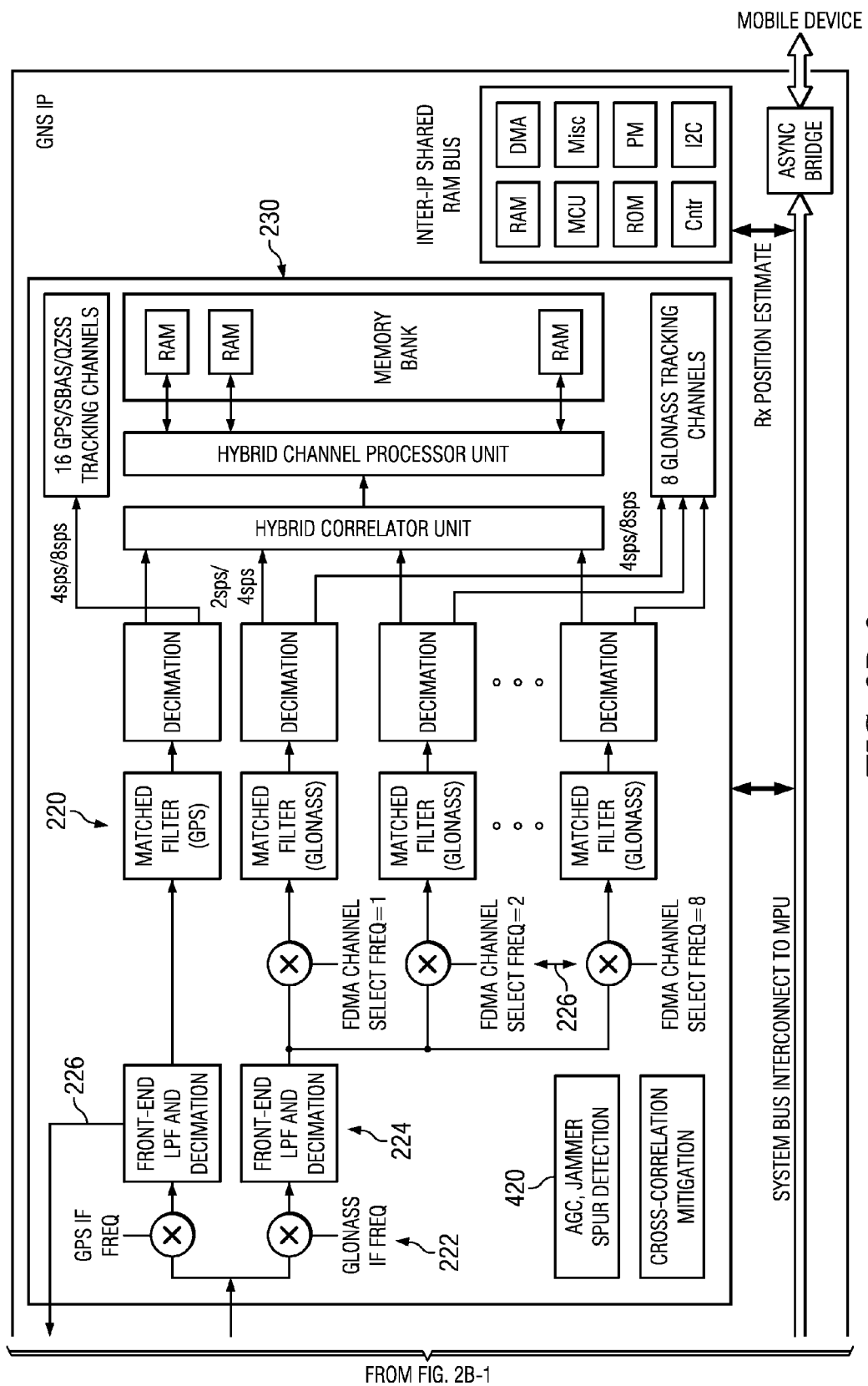
FIG. 2B is a block diagram of an inventive system including the unified receiver front-end for multiple GNSS in FIG. 2A.

The I/Q mixer pair 110I, 110Q is driven by the single LO 100, which has an in-phase line LO-I and a quadrature line LO-Q. The mixer-pair 110I, 110Q heterodynes all the plural GNSS's in approximately a 1573-1607 MHz range into a single wide shared IF (intermediate frequency) passband defined by a wide-band, low power 20 MHz filter collectively defined by each path IFA, VGA and LPADC. FIG. 2 shows the IF amplifier-pair (IFA) 120I, 120Q each with −17 MHz to +17 MHz effective passband, followed by a variable gain amplifier-pair (VGA) 130I, 130Q and a pair of low-power analog-to-digital converters (LPADC) 140I, 140Q operating at 34 MSPS (Mega samples per second) or higher frequency at least equal to Nyquist sampling rate and desirably higher.

Sampling rate circuit 145 provides the sampling signal at sampling rate Fsamp for LPADC 140I and 140Q

In the receiver combination of FIG. 2A, each IF path, such as IFA 120I and VGA 130I together act as an RC operational amplifier filter (e.g., 5th order) that establishes the approximately +/−20 MHz bandwidth and anti-aliases the LPADC 140I, and description is analogous for the IF path suffixed Q. This wide-band, low power 20 MHz filter circumscribes a GNSS-shared IF, shared between GPS, Galileo and Glonass, while rejecting irrelevant mixer products and interference outside the IF passband.

In FIG. 2B, the analog RF and IF section 210 of FIG. 2A interfaces with a digital processing section 220 through the pair of LPADCs 140I, 140Q. The LPADCs operate as a multiple-path ADC circuit and deliver important digital outputs GPS_GNS_I and GPS_GNS_Q representing an in-phase (I) IF signal and a quadrature (90 degrees phase difference) IF signal. Notice that GPS_GNS_I and GPS_GNS_Q each have GLNS and GPS/Galileo present together in them, but in different ways so that separation of these GNSS's is made possible. Providing the IQ output GPS_GNS_I and GPS_GNS_Q from the pair of LPADCs beneficially supplies these outputs as inputs for the first portion 222 of digital processing in FIG. 2B that de-rotates, separates and delivers basebands for GPS/Galileo and for GLNS. Complex de-rotation followed by LPF 224 separates the GNSS's digitally as described in further detail later hereinbelow. A closed loop 226 controls AGC and corrects DC offsets so that the digital processing circuit 220 and the front end IF section 210 adaptively interact with each other, and they also desirably coordinate and cooperate in other ways, all as further described later hereinbelow.

Thus, a dramatically more economical and power-efficient architectural structure for multiple-GNSS reception is provided. If shared SAW, LNA, and TA are provided, but separate front-ends for GPS and GLNS were to be used with distinct LO1 and LO2, the overall GPS/GLNS receiver would likely have the following:

2 LO with quadrature outputs
4 Mixers
2 Polyphase filters. (The GLNS polyphase filter is somewhat wideband with
  9.3 MHz bandpass, which likely calls for a real-estate expensive active filter.)
2 IFA, 2 VGA, 2 LPADC with real outputs.
2 Real-to-IQ digital de-rotation modules in firmware.
2 IQ low pass filter LPFs (in shared LO approach, one filter is a band-pass filter instead, which is more complicated.)

With the embodiment 210, 222, 224 in FIG. 2B, the corresponding items are:

1 LO with quadrature outputs saving 1 LO
2 Mixers saving 2 Mixers
0 Polyphase filters saving 2 polyphase filters, including one active polyphase filter.
2 IFA, 2 VGA, 2 LPADC gives IQ outputs. No difference in hardware.
2 complex-to-IQ digital de-rotation modules (can be parameterized and made one module in firmware store and executed for two different GNSS bands). This slightly more complicated IQin to IQout de-rotation is quite acceptable and appealing.
2 IQ low pass filter LPF (can be parameterized and made one module in firmware store and executed for two different GNSS basebands).

Thus, for example, the single architecture for multiple GNSS adds Glonass navigation to a GPS front end for Glonass reception with minimal overhead and dramatically increases the attractiveness of this additional performance. Some solution embodiments reduce area by about 50% and reduce power consumption in the front end by about 75% compared to using multiple receive chains. One front end solution of FIG. 2A, for example, has a projected area of 1.4 mm$^2$ in 45 nm process technology, and 18 milliampere current for operation as either GPS-only or GPS-plus-GLNS.

Moreover, the LO frequency (fLO) plan in FIG. 1 is very flexible. The sampling frequency Fsamp of the LPADCs 140I, 140Q of FIG. 2A should be at least Nyquist rate, i.e., at least twice the frequency difference from fLO to the nearest GNSS exterior band end in FIG. 1, e.g., 1573.42 or 1606.397 MHz, and is desirably greater than Nyquist rate as discussed elsewhere herein. If fLO is set at a midpoint like 1590 MHz, the sampling frequency Fsamp is about 34 MHz, and if fLO is set at either 1573 or 1607 MHz, the sampling frequency Fsamp is about doubled to 68 MHz. More generally, the IF passband in some embodiments arranged to be at least an amount given by the expression MAX[(1606.4−fLO), (fLO−1573.4)], and Fsamp is made at least twice that amount. Economic and design considerations for the LPADCs 140I, 140Q make it desirable to choose a lower value of the sampling frequency. Also, low pass filters LPF are simpler than bandpass filters both in analog IFA/VGA 120/130 and subsequent digital filtering 224.

Consider a desirable FIG. 1 range 20 of values for fLO 10 in various embodiments like FIGS. 2A and 2B. One way to set a range 20 for fLO considers imaging because if the GPS and GLNSS bands 5, 6 overlap with the image of each other, then bandpass filtering in IFA/VGA 120/130 would not be an option to separate GPS from GLNS anyway. Thought of this way, the very overlapping of each band 5, 6 with the image of the other that would deter conventional thinking from considering these embodiments, is that which is embraced and taught herein and put to beneficial use.

This imaging approach to categorizing some embodiments establishes a range 20 for fLO 10 as bounded below by the approximately the average of the GPS and GLNS band lower-ends (1597.04+1573.42)/2, and bounded above by the approximately the average of the GPS and GLNS band upper-ends (1606.397+1577.42)/2. If bandpass filtering were used in IFA/VGA 120/130, some extra frequency space would also be included at each end. The resulting convenient and approximate MHz range 20 for LO frequency 10 in embodiments resembling FIGS. 2A and 2B that desirably lack bandpass filtering in an IFA/VGA section is ~1584<fLO<~1593 MHz. This range 20 provides conveniently low bandwidth in the IF section including IFA/VGA 120/130 and LPADC 140, and also conveniently low digital processing de-rotation rate Fs in digital de-rotation of FIG. 8. And it should be understood that embodiments with fLO outside this range 20 are also feasible.

The description next discusses the numerical IF de-rotation frequencies fGPS_IF and fGLNS_IF used for GPS/Galileo and GLNS in the circuitry 220 that comes after the LPADC in FIG. 2B.

For GPS: fGPS_IF=1589.909−1575.42=14.489 MHz nominal, but can be varied quite a bit as the fLO is varied away from 1589.909 of FIG. 1. The frequency 1575.42 is a center frequency for the GPS/Galileo band 5. In general, $$fGPSIF = fLO - 1575.42. \tag{1}$$

Given a convenient FIG. 1 range 20, i.e. LO range ~1584<fLO<~1593, the corresponding range for fGPSIF using Equation (1) is approximately ~8 MHz<fGPSIF<18 MHz.

For GLNS, the frequency plan estimation herein is a little more complicated. Nominally, de-rotation frequency fGLNS_IF is about 1602−1590=12.0 MHz, but can be varied a lot because of two degrees of freedom. The frequency fGLNSband=1602 MHz is nominally a center frequency of the GLNS band 6, but the numerical choice is not critical since the GLNS satellites are FDM and have different frequencies themselves. The LO frequency fLO about 1590 MHz is also nominal and can also be varied. More generally, the GLNS IF de-rotation frequency is a difference of two frequencies, each of which can be varied:

$$fGLNS\_IF = fGLNSband - fLO. \quad (2)$$

Given a convenient LO range ~1584<fLO<~1593, and a convenient range 1597 to 1606 MHz for fGLNSband, then a corresponding range for fGLNS_IF using Equation (2) is approximately ~4 MHz<fGLNSIF<~22 MHz.

In FIG. 2B, a set 226 of de-rotator software modules or digital processing sections called frequency demultiplexers (FIG. 10) for the various GLNS satellites have further satellite-specific de-rotation frequencies Fselect to de-rotate each GLNS satellite down to its 511 chips/msec baseband. (In FIG. 2B, these de-rotation frequencies are legended SelectFreq#1, . . . SelectFreq#8.) So, if at RF a given GLNS satellite has a satellite-specific FDM frequency indexed Fsat_i, then satellite-specific de-rotation frequencies Fselect_i are given by:

$$Fselect\_i = Fsat\_i - fLO - fGLNS\_IF. \quad (3)$$

Integer PLL 102 multiplication in FIG. 2A to generate the local oscillator LO clock with frequency fLO 10 can be employed in various embodiments and uses a crystal 104 having any of the cellular crystal frequencies (standard crystal frequencies often used for cellular communications such as 16 MHz, 19.2 MHz, 26 MHz etc.). TABLE 2 shows some examples of frequency plans. Fractional PLLs, while they may be feasible for some embodiments for PLL 102, can cause fractional spurs, add phase noise due to the fractional nature of operation, and hence may call for low or narrow bandwidth to filter out the excess fractional noise. Integer PLLs are free of fractional spurs and provide a clean output clock without spurious spectral content, other than the usual harmonics of the reference clock itself.

A flexible fractional PLL is applied in some embodiments, see further entries in TABLE 2. A fractional PLL works by modifying the divide ratio of the PLL between several integer values in a extremely fast fashion to generate a fractional number. To do this with an integer PLL would involve several dividers either before or after the PLL and increasing the integer multiplication factor of the PLL loop itself, and that might degrade the noise performance and characteristics of the PLL.

Single sided bandwidth in TABLE 2 is calculated by subtracting the LO frequency 10 from the extreme edges of the GPS and GLONASS signal bandwidth, whichever is greater, i.e. MAX[(1606.4−fLO), (fLO−1573.4)]. ADC clock Fsamp 145 is run at 60-80 MHz in this example, and is above Nyquist rate to relax anti-alias filter spec and allow a transition band for the filter. Also, the sampling frequency Fsamp and its harmonics are chosen to avoid strong interferers (e.g., at one or more particular frequencies in WCDMA band at 1710-1785 MHz) aliasing back into the signal band of FIG. 1 as well as avoid interference to any of the radios or GNSS receivers in the device 250 or SoC. Thus, a GPS+GLNS mode is established by operating the RF front end of FIG. 1 LO 100 with PLL multiplication by 97 (or otherwise as tabulated) to deliver fLO 10 at about 1586-1596 MHz using about 18-23 MHz single sided bandwidth (passband) BW and ADC clock 145 between 56-57 MHz or 66-67 MHz, or 79-80 MHz.

If desired, a GPS-only mode is included by operating the RF front end LO 100 with PLL multiplication by 96 to about 1571 MHz or abut 1579 MHz using about 6 MHz single sided BW passband and ADC clock 145 between 65-66 MHz, 78-79 MHz or 56-57 MHz.

Figure 8:
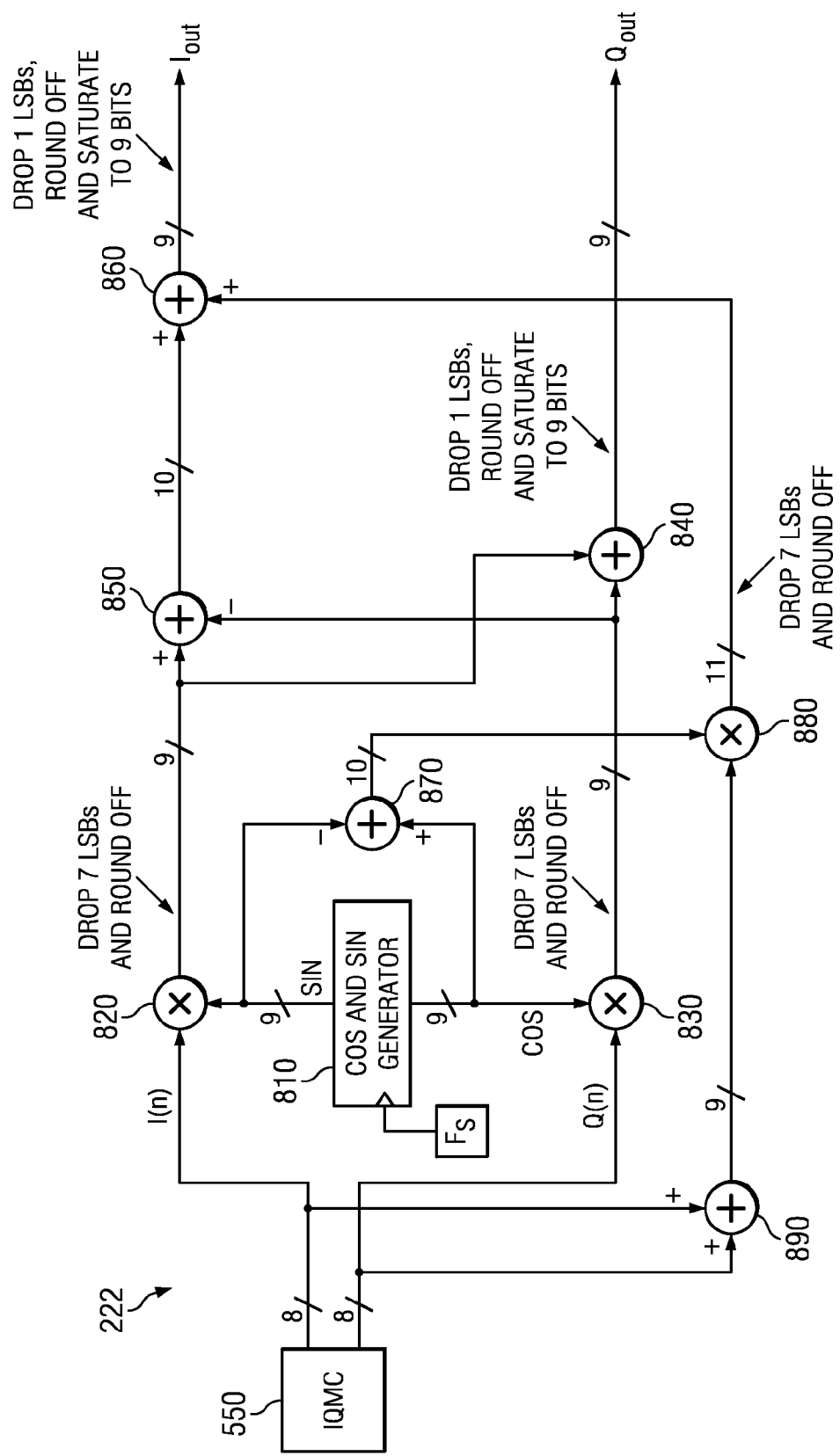
FIG. 8 is a block diagram of an inventive programmable complex de-rotation module for use in FIGS. 2B, 4, and 7A/7B.

As noted hereinabove, FIG. 2B shows a larger system diagram 210-250 including the multiple GNSS circuit 210 of FIG. 2A. After the LPADCs 140I, 140Q, digital down-conversions or de-rotations 222 in FIG. 2B and FIG. 8 are applied by a FW de-rotator module using GPS IF for GPS/Galileo and by separately executing the de-rotator module (or executing a separate module) using GLNS IF for GLNS. The de-rotations 222 are respectively followed by low pass filtering 224 to respectively pass GPS/Galileo and Glonass basebands for correlation.

By referring to the "IF:" values enumerated below the horizontal axis in FIG. 1, the spectrum of the GPS, Galileo and Glonass signals is also depicted in the passband of the −17 to 17 MHz IF at the output of the LPADC 140I, 140Q. The LO frequency 10 of 1589.909 is generated by any of the fractional PLL arrangements tabulated in FIG. 2.

Returning to FIG. 2B, the digital complex de-rotators 222 followed by digital LPF 224 are operated with suitable de-rotation frequencies respective to GPS/Galileo and to Glonass.

In another example of LO frequencies for the mixers 110I, 110Q, a TCXO crystal 104 at 16.368 MHz is provided with an integer PLL 102 providing a factor of 97 frequency multiplication according to TABLE 2 to yield LO frequency fLO=1587.70 MHz. De-rotation 222 in this example frequency-adds a GPS/Galileo de-rotation frequency fGPSIF=12.28 MHz, which is equal to the difference of

TABLE 2

GPS + GLNS FREQUENCY PLAN
GPS + GLONASS Mode

| TCXO Frequency [MHz] | Div Ratio (N) | Mult Ratio (M) | LO (=TCXO*M/N) | Required Single Sided BW [MHz] | ADC Clock option #1 DEFAULT [MHz] | ADC Clock option #2 [MHz] | ADC Clock option #3 [MHz] |
|---|---|---|---|---|---|---|---|
| 16.368 | 1 | 97 | 1587.70 | 18.70 | 66.15 | 79.38 | 56.70 |
| 32.736 | 2 | 97 | 1587.70 | 18.70 | 66.15 | 79.38 | 56.70 |
| 19.2 | 1 | 83 | 1593.60 | 20.18 | 66.40 | 79.68 | 56.91 |
| 38.4 | 2 | 83 | 1593.60 | 20.18 | 66.40 | 79.68 | 56.91 |
| 26 | 1 | 61 | 1586.00 | 20.40 | 66.08 | 79.30 | 56.64 |
| 52 | 2 | 61 | 1586.00 | 20.40 | 66.08 | 79.30 | 56.64 |
| 16.8 | 1 | 95 | 1596.00 | 22.58 | 66.50 | 79.80 | 57.00 |
| 33.6 | 2 | 95 | 1596.00 | 22.58 | 66.50 | 79.80 | 57.00 |

1587.70–1575.42 MHz. After GPS complex de-rotation, the GPS/Galileo band is at baseband 4 MHz wide. That 4 MHz width of the band is a result of the pseudorandom noise PN codes of GPS that have a chipping rate of 1023 chips per millisecond. The bandwidth is similar for Galileo with its BOC (binary offset carrier modulation) at n*1023 chips/msec (n varies). Due to the frequency addition in the GPS de-rotator, the Glonass band is at 21.620-30.977 MHz. (GLNS RF band ends of FIG. 1 less 1587.70 LO+12.28 GPS_IF.) The Glonass band is far higher in frequency and is readily rejected by low pass filtering LPF 224 and detailed further in FIG. 7B. Subsequent correlation processing in a correlator section 230 is provided, such as in the manner described in the incorporated patent application Ser. Nos. 12/719,965 and 12/726,611 and the incorporated U.S. Published Patent Application 20090054075, and/or otherwise suitably. Correlator section 230 separates and recovers GPS and Galileo data from each other.

Conversely, digital complex de-rotation 222 in GLNS digital signal processing of FIG. 2B assumes a 1602 MHz GLNS band "center" frequency and subtracts a Glonass LO frequency fGLNSIF=of 14.30 MHz from the −17 to 17 MHz output of LPADC. This de-rotation produces a Glonass baseband at −4.96 to +4.397 MHz and shifts the GPS/Galileo band to between −28.58 and −24.58 MHz. The GPS/Galileo band is rejected by another digital low pass filtering process LPF 224, and detailed further in FIG. 7A. The Glonass band includes numerous frequency division multiplexed (FDM) signal sub-bands, so various embodiments may use any suitable Glonass de-rotation 226 frequency and filtering to separate the individual FDM signals. Subsequent correlation processing in the correlator section 230 recovers Glonass data from, e.g., 511 chips/msec BPSKmodulated onto each FDM signal.

In this way, and as described in further detail in connection with succeeding Figures herein, changes or improvements on the digital processing side 220 to right of the quadrature LPADCs in FIG. 2B are provided subsequent to the Single RF Receiver Chain 210 of FIG. 2A. Galileo, GPS and Glonass signals are kept from interfering with each other, even given the special −17 to 17 MHz wide IF through which they pass combined or scrambled together. To process the signals in the passband of the −17 to 17 MHz IF to eliminate any interference from each other, digital signal processing 220 is employed after LPADC to separate out GPS, GLONASS and Galileo signals. GPS and Galileo share the same frequency band, and they are processed using one digital de-rotation and filter chain. Glonass (GLNS) is separated from GPS/Galileo by providing another post-LPADC digital de-rotation and filter. These instances of digital processing are suitably executed in hardware, or in processor software such as on a programmable digital signal processing core with instructions and parameters in flash memory or otherwise. In this way, the resulting FIG. 7A digital operation isolates one or more FDM Glonass satellite signal(s), and a second, somewhat-analogous FIG. 7B post-LPADC digital filter isolates a potential mixture of code-division GPS and Galileo satellite signals.

GPS and Galileo are separated from each other in a hybrid correlator 230 unit or section of FIG. 2B where received signal is correlated with GPS-specific and Galileo-specific PN (pseudonoise) sequences, which are orthogonal to each other. Some background on PN sequences, correlation-based satellite detection, cross-correlation mitigation, hypothesis searching and tracking, and other satellite reception technology is provided in U.S. Published Patent Application Ser. Nos. 12/726,611, 12/719,965 and 11/844,006, each of which is hereby incorporated by reference in its entirety. Such processing delivers an accurate time estimate and a receiver position estimate as described in these incorporated Published Patent Application Ser. Nos. 12/726,611, 12/719,965 and 11/844,006.

GPS and GLONASS signals, on the other hand, are located at the difference frequency—almost at the image of each other in IF 120, 130, 140. The digital front end structure 220 provides the image rejection and is operated to obtain GPS/Galileo when desired or to obtain GLONASS when desired or both. Good image rejection (>40 dB) by the digital de-rotation 222 and LPF 224 paths ensures that GPS and GLONASS signals do not interfere with each other. Depending on mode of operation, GPS and GLONASS satellite signals are concurrently received and separated from each other for navigation purposes, or can also be separately and singly obtained selectively.

Figure 3A:
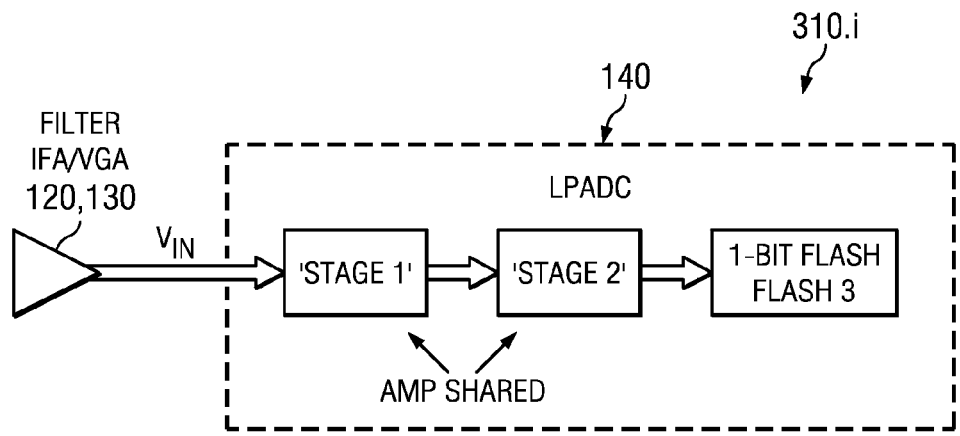
FIGS. 3A-3D are block diagrams for depicting inventive analog-to-digital converters for FIGS. 2A and 2B.
Figure 3B:
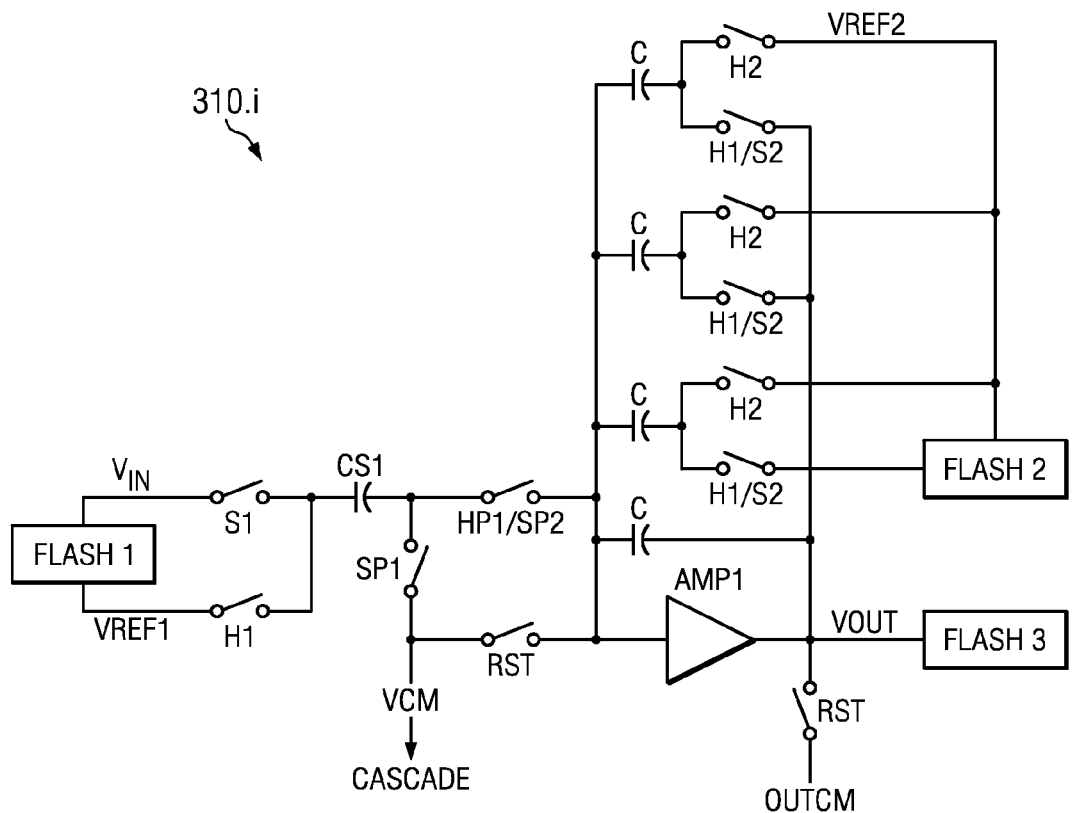
Figure 3C:
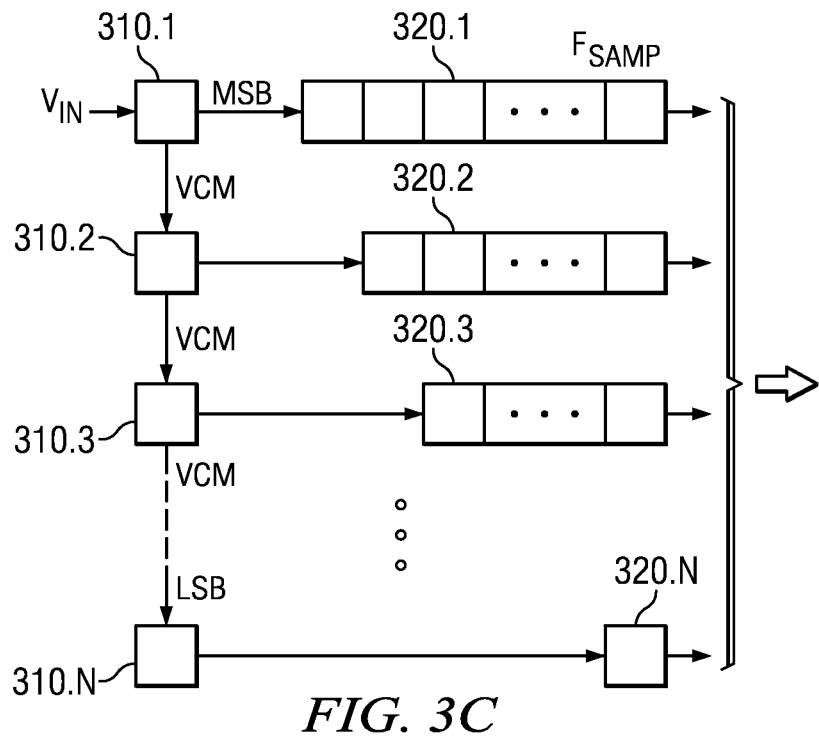
Figure 3D:
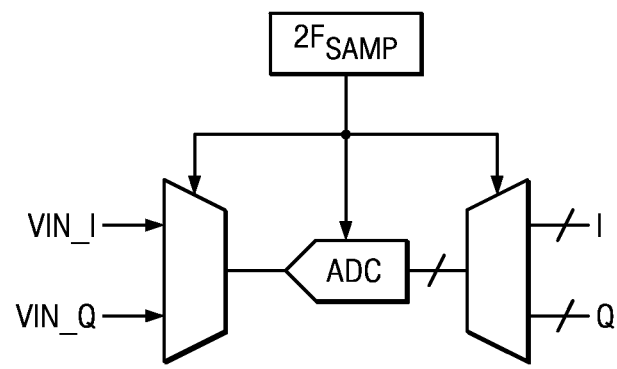

In FIGS. 2A and 2B, each LPADC 140I, 140Q is a low-resolution pipeline ADC for FIG. 2 acting overall as a 5-bit 80MSPS ADC. LPADC generates the digital bits in parallel (for FIG. 2A outputs GPS_GNS_I or GPS_GNS_Q) that electronically represent a voltage value of the varying analog input signal (VIN_I or VIN_Q) at a given latest sampling instant in digital form as a set of parallel bits for processing by the succeeding digital signal processing circuit 220 in FIG. 2B. Accordingly, each bit in the set of parallel bits is generated by a respective bit-specific ADC circuit 310.$i$ shown in FIG. 3A, detailed in FIG. 3B. A set of bit-specific ADC circuits 310.$i$, each as in FIG. 3A and FIG. 3B, are provided in cascaded parallel blocks 310.$i$ of FIG. 3C having inputs VIN all fed by IFA/VGA of FIG. 2A, and the ADC blocks 310.$i$ supply the set of parallel digital bits as their collective output, one bit each, in FIG. 3C. The first LPADC 140_I provides its set of parallel bits to represent the in-phase (I) output, and the second LPADC 140_Q provides its own set of parallel bits to represent the quadrature (Q) output. Sampling rate Fsamp is provided from sampling rate circuit 145 to both LPADCs. FIG. 3D shows that a single LPADC can be economically multiplexed in some embodiments and driven at a doubled sampling rate 2*Fsamp.

In FIG. 3A and FIG. 3B, an example of one such bit-specific ADC circuit 310.$i$, for a given bit in a set of the parallel bits, has a 2-2-1 bits pipeline ADC organization. An IFA/VGA of FIGS. 2A, 2B acts as an RC filter that drives the ADC directly. Pipeline control pulses S and H are derived from clock Fsamp and they control operations of each bit-specific ADC 310.$i$ over each clock period, and make it also act as its own SHA (sample and hold) circuit. Each ADC circuit 310.$i$ has its own bit-specific reference voltage VREF1, so that if the input voltage exceeds that VREF1, a one-bit is put in the 1-bit flash, otherwise zero (0). If one-bit, then VCM=Vin−Vref is fed from a circuit 310.1 in FIGS. 3B, 3C as input Vin to next less significant ADC bit-circuit 310.2, etc., in cascade, else VCM=Vin itself is fed as input Vin thereto (e.g., to 310.2), and so forth down to the least significant (LSB) ADC bit-circuit 310.N over a number of clock cycles equal to the number N of ADC bit-circuits. In the meantime, every clock cycle, a new sample is fed as Vin to the most significant MSB ADC bit circuit 310.1 in FIG. 3C. In that way, a binary number represented as parallel digital voltages is output in time-staggered manner from LPADC bit-circuits 310.1-310.N as a whole, and those parallel digital voltages represent in binary form the latest sampled analog voltage of the analog output of IFA/VGA. The digital circuit thus receives the bits for a given binary number staggered in storage cells 320.1-320.N of FIG. 3C which are accessed in parallel and represent a given analog sample, and shiftclocked along at the applied sampling rate. Due to the pipelining of each bit-circuit within one Fsamp clock cycle, and the pipelining of the several bit-circuits over several clock cycles, the pipelined digital output is delivered one digital sample per clock cycle.

In FIG. 3B, amplifier sharing is employed between the first stage and second stage of FIG. 3A to reduce the power consumption in the thereby low power (LP) ADC. Flip-around (Stephen-Lewis circuit) is used in 'second stage' as illustrated in FIG. 3B. Sampling capacitance CS1 is suitably established in the integrated circuit fabrication process such that, given its parallel resistance R (related to dielectric resistivity and capacitor dimensions in the fabrication process chosen), the product R×CS1 is 10 times or more as large as the number of bits (e.g. 5) in the ADC times the sampling clock period 1/Fsamp. Sampling capacitance CS1 is about four times the feedback capacitance C for the 'second stage' operation in the shared amplifier. First stage feedback capacitance 4C is desirably re-used as a second stage sampling capacitance, which means less capacitor area in the LPADC real estate and less loading on the amplifier. That way, 'stage 1' has approximately unity gain (1), and 'stage 2' has a gain of approximately four (4).

Over ranging is applied in first and second Flash1 and Flash2 to reduce offset. The 1-bit Flash3 has a comparator and a preamplifier circuit so that load due to its flash memory cell on the amplifier of FIG. 3B is reduced.

Pipeline control pulses S and SP are positive in a first half-period of clock Fsamp and otherwise zero. Pulses H and HP are spaced away from pulses S and SP by a small gap interval of zero voltage and otherwise are positive in a second half-period of clock Fsamp, and are zero in the first half-period of clock. Suffixes 1 and 2 on the pulses refer to the pipelining as if each amplifier 'stage 1' or 'stage 2' separately existed in the shared amplifier circuit.

A process of operation for the ADC 310.i of FIG. 3B is listed next.

Samp1: Flash1 gets 'stage 1' flash codes. Sample input signal across CS1 sampling cap. End of sampling phase.

RST: Reset active in gap interval. Amplifier inputs and feed-back caps sampled to eliminate memory of previous 'stage 2' operation.

Hold1/Samp2: Bit-specific reference VREF1 applied for given DAC bit, so sample voltage on CS1 is subtracted from VREF1 and applied to Amplifier AMP1. Amplifier AMP1 in 'stage 1' hold phase inverts its input so if sample CS1 voltage exceeds bit-specific VREF1, Flash2 gets flash bit one (1) else zero (0) (flash codes for binary number). End of hold phase. DAC1 (Vref2) applied, 'stage 1' residue sampled across 4C capacitance for 'stage 2'.

Hold2/Samp1: Using sample input signal currently across 4Cs, amplifier AMP1 supplies 'stage 2' output bit to Flash-3. Concurrently, Flash-1 gets new 'stage 1' flash codes, and process repeats with RST, etc.

Although a particular LPADC circuit has been described, any suitably-operative ADC circuit providing the performance described may be adopted.

In an alternative multiple-path ADC circuit embodiment of FIG. 3D, analog voltages Vin_I and Vin_Q are alternately muxed at 2*Fsamp into ADC and then the ADC output is de-muxed out as parallel digital signals to outputs I and Q for digital processing. The demux provides values of output I at rate Fsamp and likewise for output Q. The ADC block of FIG. 3D is, e.g., detailed as shown in FIGS. 3B and 3C.

In FIG. 2B, the single receiver embodiment receives GPS (L1), Galileo and Glonass Navigation systems together. This single architecture leads to a single SAW filter 155 at platform level and a single antenna 150 at platform level. Chip real estate area and system form factor are reduced, conserved, or freed up for other circuits. Providing this single architecture increases power efficiency.

One IQ RF/IF section 210 with a frequency plan for desired performance supports this GPS/Galileo/Glonass satellite receiver. IQ RF architecture is combined into a GPS receiver embodiment in FIGS. 2A, 2B and 4.

Figure 4:
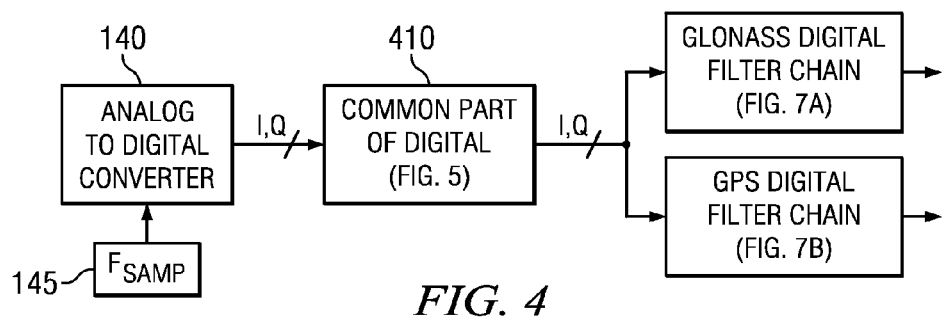
FIG. 4 is a block diagram of an inventive electronic circuit for use in the inventive system of FIG. 2B.

Turning to FIG. 4, the digital processing has three parts: a common (shared) digital part 410, a GPS-specific part and a GLONASS-specific part. The common part 410 of FIG. 4 includes AGC 420, DC offset 430, and IQ mismatch calibration logic 550 as units, or modules of FIG. 5. The GPS-specific and GLONASS-specific component of the filter chain includes decimation filters, de-rotator and resampler for generation of 8 sps, 4 sps, 2 sps and 1 sps GPS and GLONASS signal, respectively.

In FIG. 4, the digital section is bifurcated for hybrid reception of GPS and GLONASS. The Common Part 410 of the signal processing chain has AGC 420, DC offset 430 and IQ mismatch 550 compensation loops and needs no decimation or sample-rate conversion filters. When the receiver is programmed in GPS-only mode, then the common part 410 and GPS-specific part (FIG. 7B) are active; and the GLONASS-specific part is suitably clock-gated to save power. When the receiver is programmed in GLONASS-only mode, then the common part 410 and GLONASS-specific part (FIG. 7A) are active; and the GPS-specific part is suitably clock-gated to save power.

Figure 5:
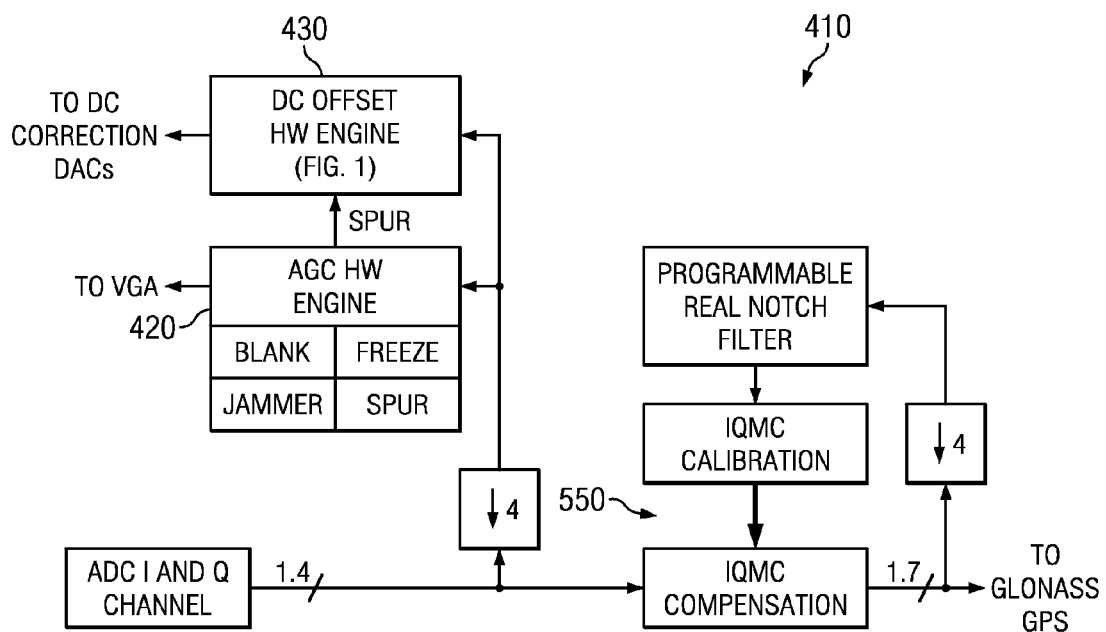
FIG. 5 is a more detailed block diagram detailing an inventive Common Part section in the inventive electronic circuit of FIG. 4.

In FIG. 5, the common part 410 of the signal processing chain of FIG. 4 is shown in further detail. This segment of the digital processing 220 accomplishes AGC 420, DC offset compensation and calibration 430, IQ mismatch compensation IQMC 550 (and IQMC calibration block), and residual DC removal in digital (see discussion involving offsets $D_i$ and $D_q$ later hereinbelow). Note that the bandwidth of signal at ADC output is close to 20 MHz. The sampling rate Fsamp can be kept low by down-converting both GPS and GLONASS signals to zero-IF. This is accomplished using a digital de-rotator 222, the parameters of which are different for GPS and GLONASS. Therefore the de-rotator and subsequent blocks are described as if for separate GLONASS digital processing section in FIG. 7B and GPS/Galileo processing section in FIG. 7B.

Figure 6:
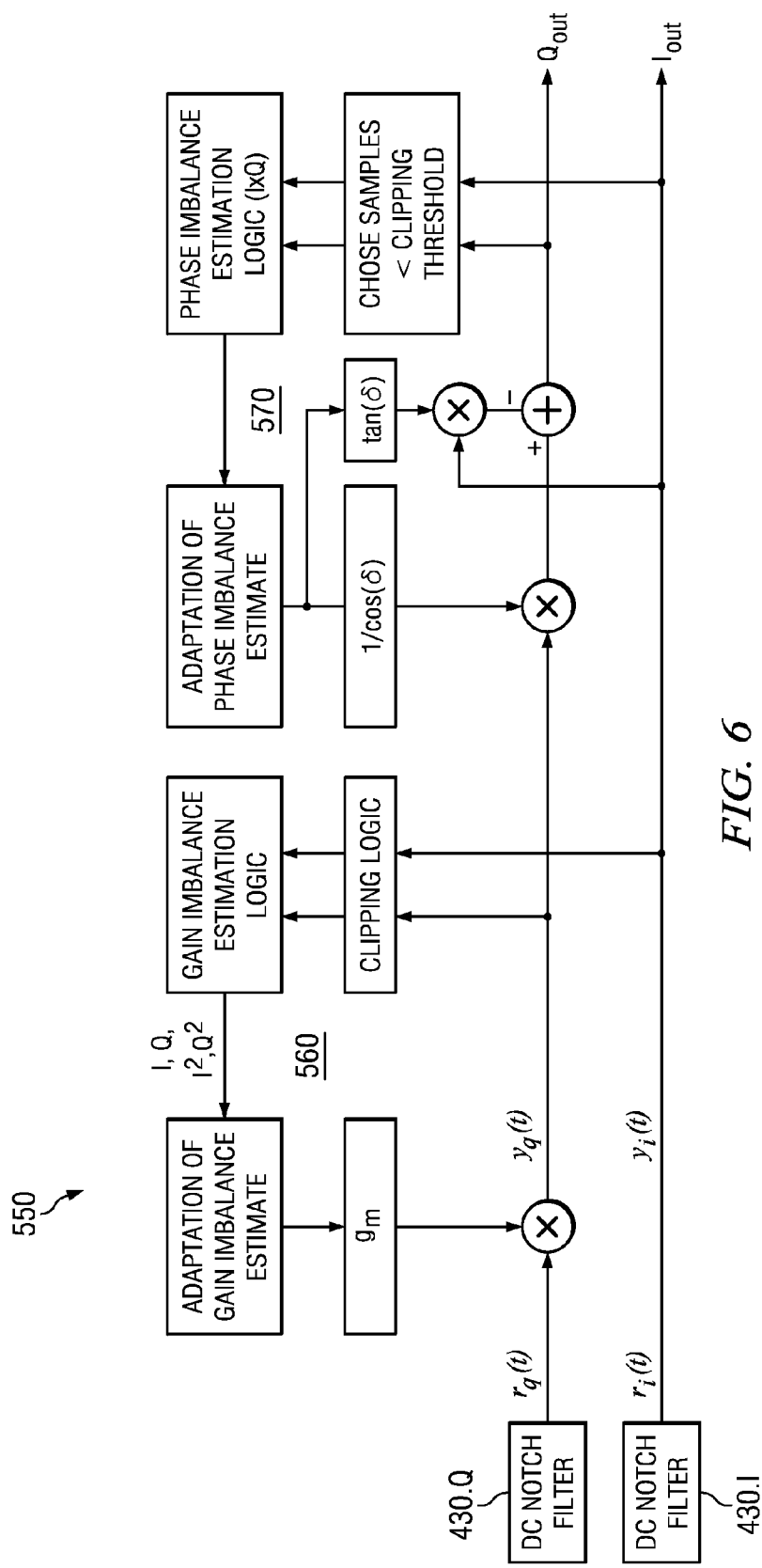
FIG. 6 is a still more detailed block diagram detailing an inventive IQMC section in the inventive Common Part section of FIG. 5.

In FIG. 6, the IQ mismatch calibration and compensation block IQMC 550 of FIG. 5 is detailed. IQMC is a process of cleaning up IQ signals so they have the same amplitude and differ in phase by 90 degrees. IQMC 550 in gain imbalance 560 and phase imbalance 570 continually accumulates the respective average for each of signal I and Q, the average square of the I signal, the average square of the Q signal, and the average of the product I*Q in phase imbalance 570, until a specified number of accumulations, e.g. 4096, are reached, whereupon a fresh accumulation begins. Briefly stated, the operations for gain compensation section 560 accumulate the average squares of I and Q with DC offset eliminated. Whichever is the signal I or Q for which the average square is less in section 560, that signal is multiplied by a gain factor $g_m$ equal to the square root of the ratio of the larger average square to the smaller average square. Equivalently, and with only one multiplier or multiplication in gain compensation section 560, gain factor $g_m$ is made proportional to $r_i(t)/r_q(t)$, which is an rms ratio of in-phase to quadrature, and applied in FIG. 6 to the quadrature input signal Q alone. That rms ratio $r_i(t)/r_q(t)$ is based on the current signal statistics and is equal or made about equal to a value expressed as $\sqrt{[(X_i-D_i^2)/(X_q-D_q^2)]}$, i.e., the square root of the ratio of the average square X, of in-phase signal I to the average square $X_q$ of quadrature signal Q, with squares of respective offsets $D_i$ and $D_q$ removed. Alternatively, the reciprocal of that gain compensation ratio can be applied to the I-input instead of Q-input, or even modified to apply other gain compensations in any suitable manner to both I-input or Q-input, e.g. applying reciprocal compensations to seek their average or otherwise to seek some other equalized value. Further details of IQMC 550, AGC 420, and DC Offset engine 430 are provided herein after description of more of the signal paths.

Figure 7A:
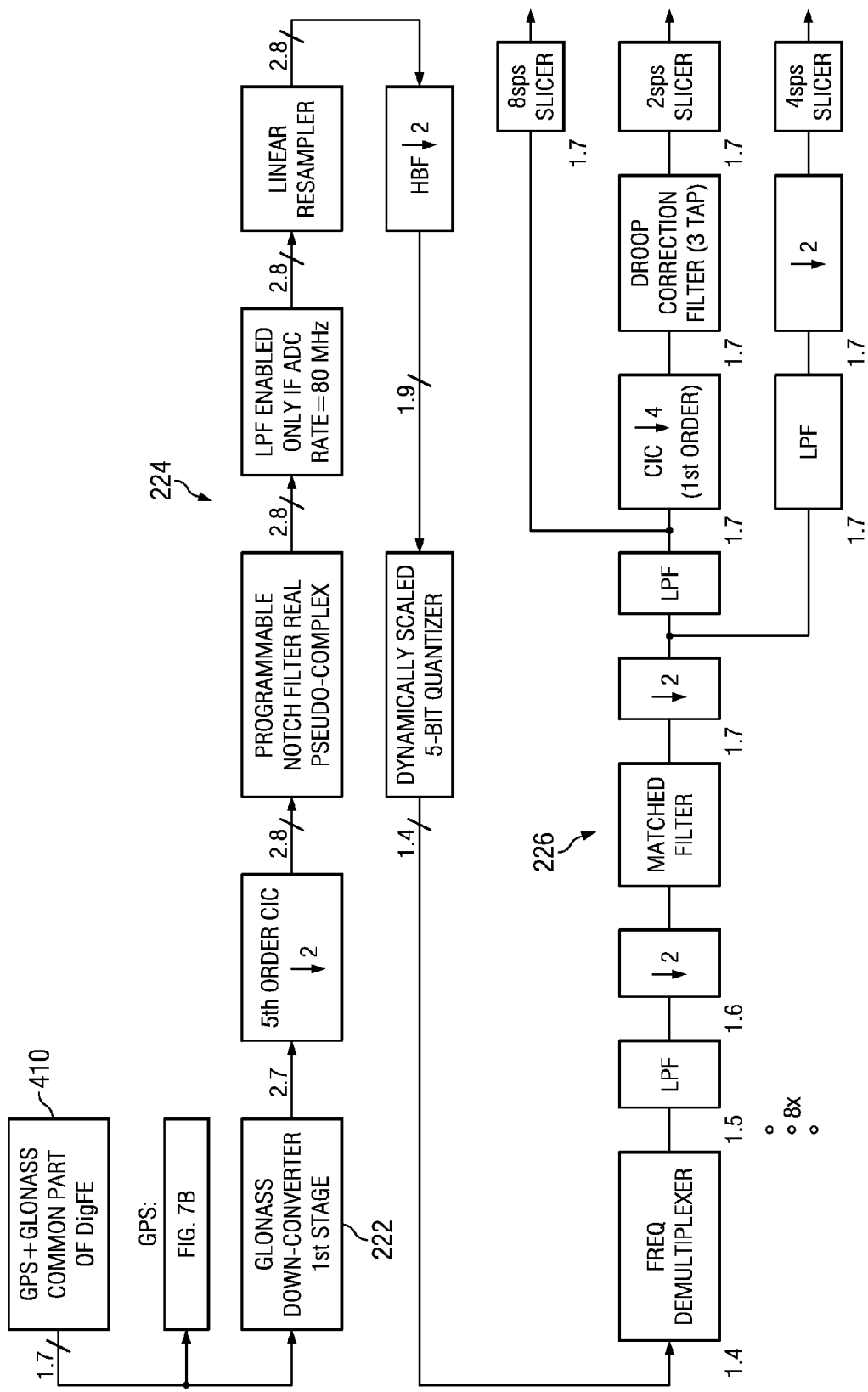

FIG. 7A shows the GLONASS part of the digital signal processing chain of FIG. 4. Common part 410 including IQMC block 550 output from FIG. 6 is fed to the GLONASS signal processing chain of FIG. 7A, which performs de-rotation 222, low-pass filtering 224, re-sampling, and frequency de-multiplexing 226 (detailed in FIG. 10) followed by matched filtering of the GLONASS signal. TABLE 3 further details the GLNS digital modules. A binary-point notation is as follows: In an example for understanding binary-point legends shown in FIG. 7A and FIG. 7B and tabulated in TABLES 3 and 4, a value quantized to e.g., 5 bits I,Q, is represented in this analysis as m.n=1.4. The digital front end before the slicer (slicer is a BPSK demodulator) desirably has a bit width that keeps total in-band quantization noise of the digital signal processing to be approximately 10 dB below the quantization noise floor of the ADC 140, so that the contribution of the digital signal processing to the overall noise figure is small or negligible.

TABLE 3

DIGITAL MODULES IN 8/4/2sps GLNS PATHS

| Module | Bit width (Q format) | Sampling freq Msps |
|---|---|---|
| IQMC | 1.7 | 66 |
| GLNS Down converter, de-rotator | 2.7 | 66 |
| CIC filter, $5^{th}$ order ↓2 | 2.8 | 33 |
| Notch Filter −1 | 2.8 | 33 |
| Notch Filter −2 | 2.8 | 33 |
| LPF (for 80 MHz ADC clk) | 2.8 | 33 |
| Linear Resampler | 2.8 | 33 |
| Half Band Filter ↓2 | 1.9 | 16.352 |
| Dynamic Quantizer | 1.4 | 16.352 |
| Freq Demultiplxer | 1.5 | 16.352 |
| LPF1 | 1.6 | 16.352 |
| Matched Filter | 1.7 | 8.176 |
| 8sps LPF (8sps out) | 1.7 | 4.088 |
| LPF ↓2 (4sps out) | | |
| CIC 1st order ↓4 | 1.7 | 8.176 |
| Droop Correction Filter (2sps out) | 1.7 | 0.511 |

Figure 7B:
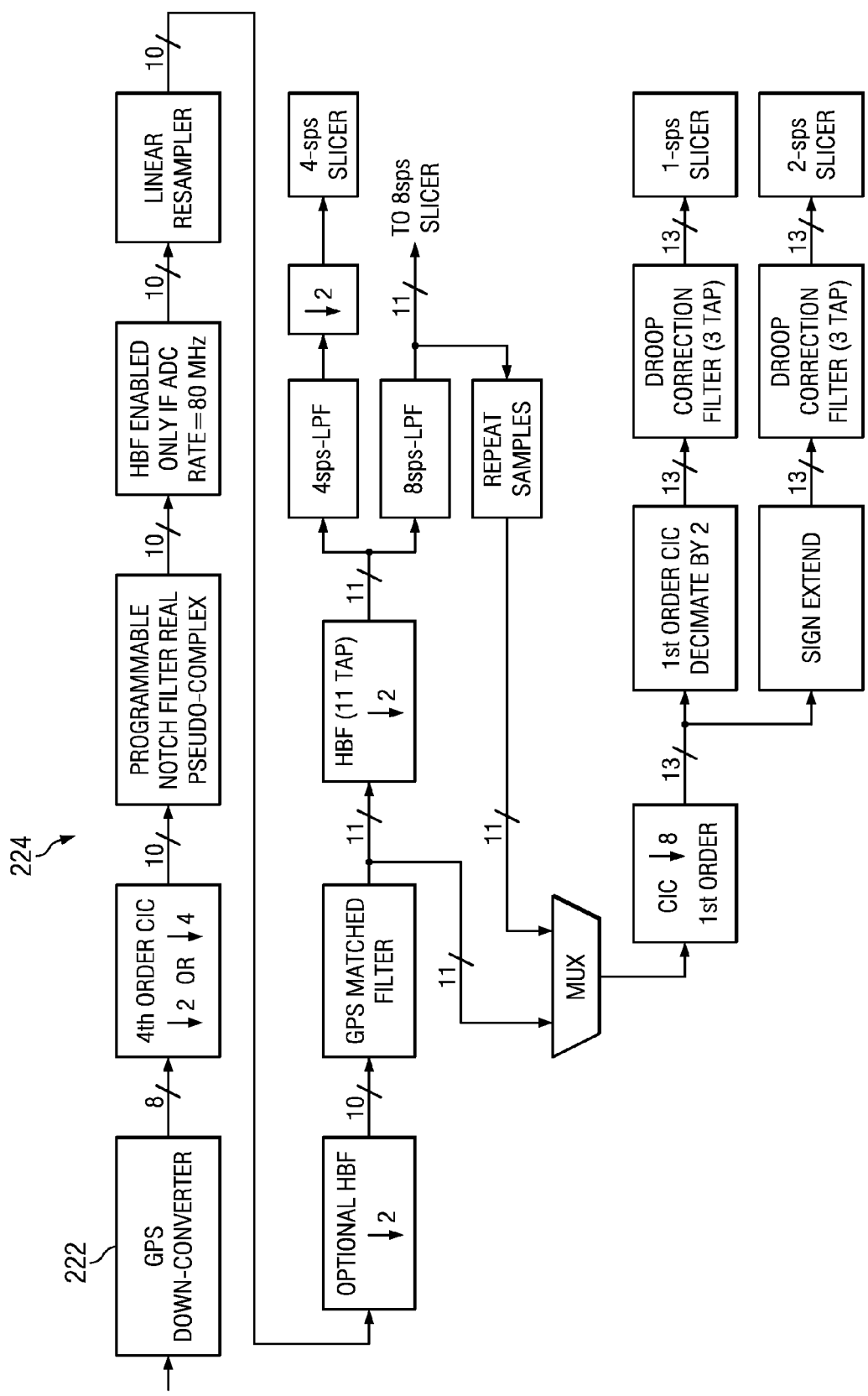

In FIG. 7A and FIG. 7B, the CIC filter, notch filter, LPF (enabled if rate=80 MHz), and HBF in the front end of the digital filter chain collectively act as the LPF function 224 associated with each complex de-rotation 222 in FIG. 2B. Since the GLNS spectrum is wideband, higher order CIC filters are used to provide sufficient aliasing rejection, e.g., a $5^{th}$ order, length-2 (decimation by 2) CIC filter with overall impulse response convolving an impulse response [1 1] with itself 4 times. (Nth order, decimation by M convolves M-long impulse response of ones with itself N−1 times.)

The programmable notch filter in GLNS path is complex-valued because its magnitude response is not symmetric around DC. If GLNS signal band is centered around DC, then if the notch is placed in, say, a +f MHz GLNS channel, then the −f MHz GLNS channel should be untouched. A complex notch filter is used to place the notch in this way.

A GLNS low-pass filter is clock-activated when ADC clock Fsamp is close to 80 MHz. This is because in that case, sampling rate at re-sampler input is 40 MHz, which along with any jammer may be converted into 32.704±4.5 MHz by the re-sampler and may alias back. Therefore, this LPF is used to reject noise/jammers aliasing back due to re-sampling. Note that for other ADC frequencies (61 and 66 MHz), the LPF is omitted by clock-gating it.

The dynamically-scaled 5-bit quantizer in the GLNS path performs accumulation of abs(I) and/or abs(Q) into a register for firmware to use for computing the location of bits which are to be picked from the input signal. Either |I(n)| or |Q(n)| is accumulated for 4096 samples depending on a register configuration, and may be restarted by FW again. FW programs bit location in the input of the MSB output starting bit, and total of 5 bits starting from the programmed bit location are kept and passed as quantizer output.

In FIG. 7B, the GPS digital processing chain lacks frequency demultiplexing compared to FIG. 7A GLNS digital processing, and is represented by TABLE 4.

TABLE 4

DIGITAL MODULES IN 8sps, 2sps GPS PATHS

| Module | Bit width (Q format) | Sampling freq Msps |
|---|---|---|
| IQMC | 1.7 | 64 |
| GPS Down converter, de-rotator | 2.7 | 64 |
| CIC filter ↓2 or ↓4 | 2.8 | 32 |
| Notch Filter −1 | 2.8 | 32 |
| Notch Filter −2 | 2.8 | 32 |
| LPF (for 80 MHZ ADC clk) | 2.8 | 32 |
| Linear Resampler | 2.8 | 32 |
| Half Band Filter ↓2 | 2.9 | 16 |
| Matched Filter | 2.10 | 16 |
| Half Band Filter ↓2 | 2.10 | 8 |
| 8sps LPF (8sps out) | 2.10 | 8 |
| CIC ↓8 | 2.10 | 2 |
| Droop Correction Filter (2sps out) | 3.10 | 2 |

TABLE 5 shows registers for the digital signal processing chains of FIGS. 7A and 7B including programming de-rotation (frequency converter) for GPS/Galileo and for Glonass. Default values are zero.

TABLE 5

REGISTERS FOR GPS AND GLNS DIGITAL SIGNAL CHAINS

| | |
|---|---|
| GPS_Init | Init bit for the frequency converter in GPS path. When this is set to 1 then, at 1 ms frame boundary, the phase accumulator is restarted with GPS_PhaseCmd as the initial phase. |
| GPS_Freq_Cmd | GPS_Freq command is a 24 bit word computed from rounded ratio of desired freq of rotation fGPSIF divided by sampling frequency Fs of the input signal to the frequency converter. Controls GPS-specific phase increment. |
| GPS_PhaseCmd | Phase command. When freq converter is restarted at 1 ms frame boundary by setting Init bit high, the phase accumulator is initialized to this value. Value is represented using an 8 bit signed number, where $-2^7$ corresponds to $-\pi$ and $2^7$ corresponds to $+\pi$. |
| GLNS_Init | Init bit for the frequency converter in GLNS path. When this is set to 1 then, at 1 ms frame boundary, the phase accumulator is restarted with GLNS_PhaseCmd as the initial phase. |
| GLNS_Freq_Cmd | GLNS_Freq command is a 24 bit word computed from rounded ratio of desired freq of rotation fGLNSIF divided by sampling frequency Fs of the input signal to the frequency converter. Controls GLNS-specific phase increment. |
| GLNS_PhaseCmd | Phase command. When freq converter is restarted at 1 ms frame boundary by setting Init bit high, the phase accumulator is initialized to this value. |

Figure 9:
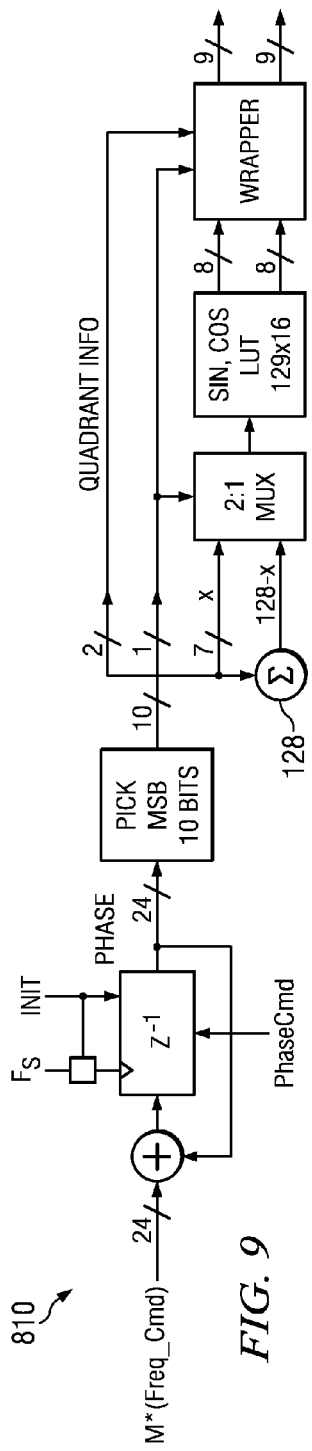
FIG. 9 is a block diagram of an inventive programmable generator circuit for the inventive programmable complex de-rotation modules of FIGS. 8 and 10.

In FIG. 8, an illustrated programmable de-rotator 222 (frequency converter 1$^{st}$ stage) embodiment has two parts, one part shown in FIG. 9: a COS lookup table and a phase computation logic for computation and access to COS and SIN coefficients across time. In FIG. 8, further circuitry of the de-rotator 222 (frequency converter) electronically performs multiplications and two additions consistent with Equations (5A-) and (5B-).

FIG. 8 details the programmable de-rotator 222, also called a down-converter (1$^{st}$ stage) of both FIGS. 7A and 7B. In FIG. 9, a programmable trigonometric SIN and COS generator 810 supplies values of sine and cosine to the de-rotator of FIG. 8. This first down-converter 222 converts the frequency of the GLONASS (or GPS/Galileo) band from IF to a lower frequency band or baseband before resampling. Instead of using a real signal at the frequency-convert input and generating a complex output as in Equations (4A/4B), both the input and output are complex in FIG. 8 and Equations (5A/B-GPS) and Equations (5A/B-GLNS).

$$Iout(n) = Iin(n)\cos\left(2\pi \frac{fgps}{Fs}n\right) \quad (4A)$$

$$Qout(n) = Iin(n)\sin\left(2\pi \frac{fgps}{Fs}n\right) \quad (4B)$$

$$Iout(n) = Iin(n)\cos\left(2\pi \frac{fgps}{Fs}n\right) - Qin(n)\sin\left(2\pi \frac{fgps}{Fs}n\right) \quad (5A\text{-}GPS)$$

$$Qout(n) = Iin(n)\sin\left(2\pi \frac{fgps}{Fs}n\right) + Qin(n)\cos\left(2\pi \frac{fgps}{Fs}n\right) \quad (5B\text{-}GPS)$$

$$Iout(n) = Iin(n)\cos\left(2\pi \frac{fglns}{Fs}n\right) - Qin(n)\sin\left(2\pi \frac{fglns}{Fs}n\right) \quad (5A\text{-}GLNS)$$

$$Qout(n) = Iin(n)\sin\left(2\pi \frac{fglns}{Fs}n\right) + Qin(n)\cos\left(2\pi \frac{fglns}{Fs}n\right) \quad (5B\text{-}GLNS)$$

Notice the TABLE 5 dimensionless ratios designated GPS_Freq=fgps/Fs and GLNS_freq=fglns/Fs in the IQ equations 5A-/5B-. Each sine or cosine trigonometric argument calculates latest phase, with frequency as a parameter. Since this is the programmable FIG. 8 de-rotator 222 part of the digital processing, the frequency of the SIN and COS generator 810 in FIG. 9 is established by the TABLE 5 Freq_Cmd for the GPS IF or the GLNS IF of FIG. 2B in the respective GPS or GLNS de-rotation. In the Equations (5A-/5B-), de-rotation frequency Fgps is the same as fGPS_IF or GPS IF in FIG. 2B, and de-rotation frequency Fglns is the same as fGLNS_IF in FIG. 2B. Also, Fs in the ratio is the rate of 'sampling' or accessing values from the SIN and COS LUT(s) in FIG. 10 for de-rotation. This rate Fs is suitably about the same as or higher than the sampling rate Fsamp for LPADC 140 in FIG. 2A.

The ratio Fgps/Fs (alternatively Fglns/Fs) is the fraction of a unit circle in which the 'sampling' successively occurs for de-rotating the GPS/Galileo or GLNS signals respectively. That ratio, which is conceptually multiplied by $2\pi$ in the Equations (5A-, 5B-) to represent the respective distinct phase increments for GPS and GLNS, is instead converted to an appropriate binary address increment that is multiplied by index n for addressing the LUT. Index n is increased at access rate Fs and signifies how many sample points are so far accessed for SIN and COS values in the LUT of FIG. 9. The software and/or hardware also takes into account the number M of LUT entries that were originally entered to cover the unit circle, to issue the correct LUT addressing by any suitable way, such as a modulo rounded value [RND((Freq_Cmd)* M*n)]$_{modM}$. The limited-length accumulator register ($z^{-1}$) performs modulo accumulation, and the Pick_MSB_10-bits block in FIG. 9 performs rounding. To save LUT space, the FIG. 9 circuit uses the top MSB two bits to represent the angular position by quadrants '00' for 0-90 degrees, '01': 90-180, '10': 180-270, '11': 270-360. Further, LUT space is saved by recognizing symmetry $\cos(\pi/2-\theta)=\sin(\theta)$ in each half-quadrant. A single line bit (at 3$^{rd}$ from top MSB) represents each half-quadrant and controls a 2:1 Mux that shifts in a 7-bit angle address x or 128-x. The LUT has 128 addressable entries in this example to represent a half-quadrant (45 degree range) of trigonometric values for angles, and numerous other organizations and levels of precision may be arranged. As output, generator 810 delivers 8-bit magnitude values of SIN and COS along with the appropriate signs (9$^{th}$ output lines) decoded from the two-bit Quadrant Info lines.

Note that Equations (5A-) and (5B-) in each of the GPS and GLNS cases can be condensed into a matrix Equation (5), which shown in abbreviated notation as an input IQ vector pre-multiplied by a 2×2 matrix of trig functions to yield an output IQ vector.

$$\begin{bmatrix} Iout(n) \\ Qout(n) \end{bmatrix} = \begin{bmatrix} \cos(\Phi(n)) & -\sin(\Phi(n)) \\ \sin(\Phi(n)) & \cos(\Phi(n)) \end{bmatrix} \begin{bmatrix} Iin(n) \\ Qin(n) \end{bmatrix} \quad (5)$$

Thus, the digital signal process 222 of FIG. 8 operates to deliver output IQ as a linear combination of input IQ from IQMC, and the linear combination has trigonometric multiplications.

The digital signal process 222 of FIG. 8 is replicated and the replica processes are driven at respective rates for GPS and GLNS as indicated in the trigonometric arguments of the equations (5A-) and (5B-). In FIG. 8, a generator 810 of electronic representations of values of the cosine and sine functions supplies a sine output to a multiplier 820 at rates given by the arguments in Equations (5A) and (5B) for GPS or GLNS. IQMC 550 electronically supplies samples I(n) for multiplication by multiplier 820, thereby supplying an I(n) sin( ) output to a plus input of each of a summer 840 and a summer 850. IQMC 550 electronically supplies samples Q(n) for multiplication by multiplier 830, thereby supplying an I(n) cos( ) output to a plus input of the summer 840 and a subtracting (minus) input of the summer 850.

The output of summer 840 electronically represents Q$_{out}$(n) of Equation (5B-) as straightforwardly appears from FIG. 8.

In FIG. 8, the output of a summer 860 electronically represents I$_{out}$(n) of Equation (5A-) due to the combined operations of summers 810, 850 and 890, and multipliers 820, 830 and 880. An output S$_{850}$ of Summer 850 is given by Equation (6), wherein symbol f$_g$ represents whichever de-rotation frequency of GPS or GLNS is involved.

$$S_{850} = Iin(n)\sin\left(2\pi \frac{fg}{Fs}n\right) - Qin(n)\cos\left(2\pi \frac{fg}{Fs}n\right) \quad (6)$$

To obtain I$_{out}$(n), summer 860 adds S$_{850}$ of Summer 850 with an output M$_{880}$ of Multiplier 880. For inputs to the Multiplier 880, Summer 890 provides the sum of the I and Q inputs, and summer 810 provides the difference of the cosine value minus the sine value. That output M$_{880}$ of Multiplier 880 is given by Equation (7):

$$M_{880} = (Iin(n) + Qin(n))\left[\cos\left(2\pi \frac{fg}{Fs}n\right) - \sin\left(2\pi \frac{fg}{Fs}n\right)\right] \quad (7)$$

Inspection demonstrates that the sum of Equations (6) and (7) is indeed equal to I$_{out}$(n) in either of Equations (5A-).

For an example showing how negative frequencies are recovered, suppose that a component of the GNSS spectrum is at a negative frequency due to the heterodyning in mixers 110I, 110Q, so that in-phase input component I is given by Equation (5A). Remember that either cosine or sine of a negative frequency or a positive frequency expresses overlap in the IF passband and both negative and positive frequencies are previously low-pass filtered together by IF section collective operation of IFA/VGA/LPADC prior to de-rotation.

$$Iin(n) = \cos\left(2\pi\left(\frac{-fgps + f}{Fs}\right)n + \theta\right) \quad (8A)$$

Let the quadrature input component Q subtract 90 degrees from the argument, changing cosine to sine, so that an Equation (5B) reads:

$$Qin(n) = \sin\left(2\pi\left(\frac{-fgps + f}{Fs}\right)n + \theta\right) \quad (8B)$$

Substituting these input components Iin and Qin from Equations (8A) and (8B) into the GPS equations (5A-GPS) and (5B-GPS) and simplifying yields Equations (9A) and (9B). The result amounts to addition of arguments which cancels out the negative GPS frequency.

$$Iin(n) = \cos\left(2\pi\frac{f}{Fs}n + \theta\right) \quad (9A)$$

$$Qin(n) = \sin\left(2\pi\frac{f}{Fs}n + \theta\right) \quad (9B)$$

Note that this result depends on a definition of quadrature component as subtracting 90 degrees. Suppose, in some other embodiments, the definition of quadrature component instead adds 90 degrees, changing cosine in Equation (5A) to negative trigonometric sine instead of positive sine in Equation (5B). In such other embodiments wherein the definition of quadrature component instead adds 90 degrees due to LO-Q, then the FIG. 8 digital signal process 222 is revised to effectuate the below-primed Equation pairs (5A'-) and (5B'-) for GPS and GLNS.

$$Iout(n) = Iin(n)\cos\left(2\pi\frac{fgps}{Fs}n\right) + Qin(n)\sin\left(2\pi\frac{fgps}{Fs}n\right) \quad (5A'\text{-GPS})$$

$$Qout(n) = Iin(n)\sin\left(2\pi\frac{fgps}{Fs}n\right) - Qin(n)\cos\left(2\pi\frac{fgps}{Fs}n\right) \quad (5B'\text{-GPS})$$

$$Iout(n) = Iin(n)\cos\left(2\pi\frac{fglns}{Fs}n\right) + Qin(n)\sin\left(2\pi\frac{fglns}{Fs}n\right) \quad (5A'\text{-GLNS})$$

$$Qout(n) = Iin(n)\sin\left(2\pi\frac{fglns}{Fs}n\right) - Qin(n)\cos\left(2\pi\frac{fglns}{Fs}n\right) \quad (5B'\text{-GLNS})$$

The digital signal process alternative to that of FIG. 8 is the same as that of FIG. 8 except that the input of summer 840 fed by Qin cos( ) multiplier 830 is made subtractive. The result for Qout then matches Equations (5B'-).

To also obtain Iout for Equations (5A'-) in the alternative digital signal process, the input of summer 850 from that multiplier 830 is made additive and the input of summer 890 fed by Qin is made subtractive. That way, the revised (primed) Equations (6') and (7') are:

$$S'_{850} = Iin(n)\sin\left(2\pi\frac{fg}{Fs}n\right) + Qin(n)\cos\left(2\pi\frac{fg}{Fs}n\right) \quad (6')$$

$$M'_{880} = (Iin(n) + Qin(n))\left[\cos\left(2\pi\frac{fg}{Fs}n\right) - \sin\left(2\pi\frac{fg}{Fs}n\right)\right] \quad (7')$$

Note also in Equations (5A'-) and (5B'-), that while Qin is Iin plus 90 degrees, Qout is Iout minus 90 degrees. If it is desired to maintain consistency of definition of quadrature, then one of the two summers 840 or 860 has its output sign flipped. It should be evident that a variety of embodiments are thus possible.

The digital signal process 222 of FIG. 8, or alternative digital signal process similar to FIG. 8, reduces noise by substantially eliminating a two-times-frequency component that would otherwise result from a simpler digital signal process based on Equations (4A) and (4B). That component that would otherwise result can be derived by substituting Equation (8A) into Equations (4A) and (4B) with result given in Equations (10A) and (10B). While the simpler digital signal process based on Equations (4A) and (4B) might be feasible for some embodiments herein, the down-converter digital signal process of FIG. 8 used in the embodiments emphasized herein beneficially reduces the amount of irrelevant spectral content to be eliminated by filter digital signal process following the digital signal process of FIG. 8. Also, some choices of fLO and fgps can heterodyne GLNS signals into the baseband and thereby introduce a GLNS image into the GPS/Galileo correlators (and vice-versa for GPS image into GLNS). Put another way, the output from the digital signal process 222 of FIG. 8 delivers greater signal strength from satellites in the desired band compared to strength of irrelevant spectral content and images.

$$Iin(n) = \cos\left(2\pi\left(\frac{-fgps + f}{Fs}\right)n + \theta\right)\cos\left(2\pi\frac{fgps}{Fs}n\right) \quad (8A, 4A)$$

$$= 0.5\cos\left(2\pi\frac{f}{Fs}n + \theta\right) + \quad (10A)$$

$$0.5\cos\left(2\pi\left(\frac{-2fgps + f}{Fs}\right)n + \theta\right)$$

$$Iout(n) = \cos\left(2\pi\left(\frac{-fgps + f}{Fs}\right)n + \theta\right)\sin\left(2\pi\frac{fgps}{Fs}n\right) \quad (8A, 4B)$$

$$= 0.5\sin\left(2\pi\frac{f}{Fs}n + \theta\right) - \quad (10B)$$

$$0.5\sin\left(2\pi\left(\frac{-2fgps + f}{Fs}\right)n + \theta\right)$$

As pointed out in the previous paragraph, IQ de-rotation 222 of FIG. 8 eliminates a potential GLNS image into GPS baseband that would otherwise occur in an approach represented by Equations (7A) and (7B). Consider the symbol "f" in Equations (10A) and (10B) as representing not only the GPS modulation on a negative (−17 MHz) GPS frequency as above, but also think of it having a GLNS component situated +34 MHz above the (−17 MHz) GPS frequency. Inspection of each second term involving −2fgps+f shows that that GLNS component is or can be imaged into baseband where f−2fgps=0 if real-to-IQ rotation of Equations (4A) and (4B) were used for multiple-GNSS. Thus, the output from the digital signal process 222 of FIG. 8 delivers greater signal strength from satellites in the desired GPS (or GLNS) band compared to strength of image signals due to satellites in the other GNSS band (GLNS or GPS respectively). The IQ de-rotator 222 eliminates a potential GLNS image into GPS baseband because GPS is at about −15 MHz and GLNS is at about +15 MHz, so de-rotation based on only real input "I" alone would put both GPS and GLNS into baseband. IQ complex de-rotation as taught herein substantially eliminates the image.

Figure 10:
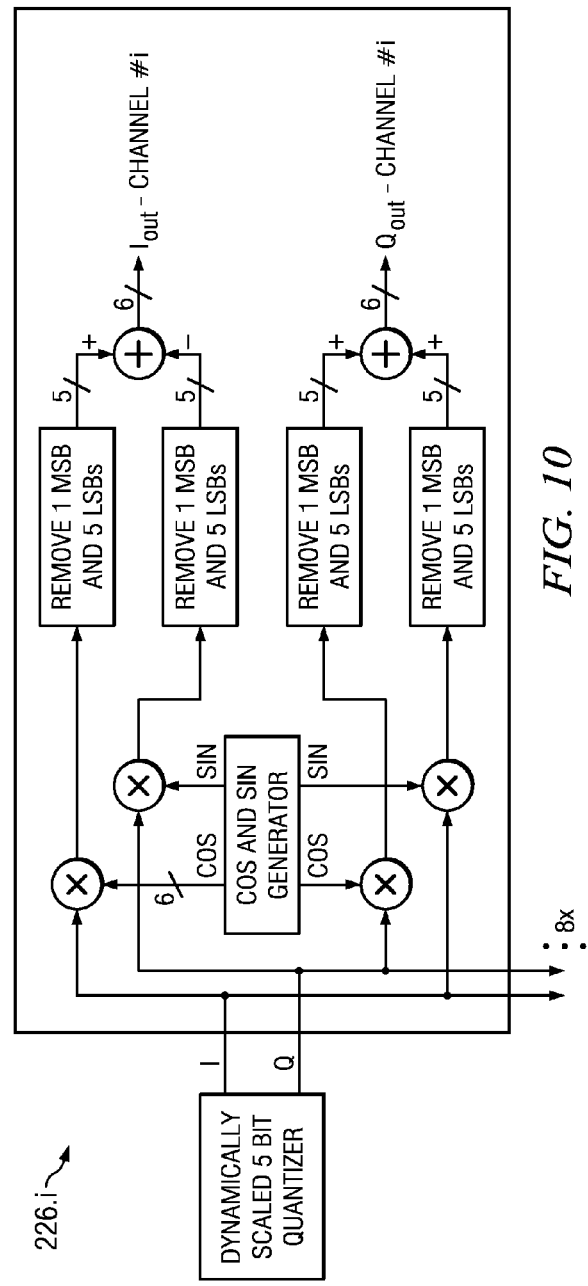
FIG. 10 is a block diagram of another inventive programmable complex de-rotation module for use in FIGS. 2B, 4, and 7A/7B.

Turning to FIG. 10, one of the GLNS frequency de-multiplexers 226.i of FIGS. 2B and 7A is detailed. A dynamically scaled Quantizer provides multibit inputs to multipliers that form their respective products with SIN or COS outputs from the generator 810 of FIG. 9 or one adapted for the purpose. The GLNS frequency de-multiplexers 226.i form respective channel-specific IQ outputs paralleling Equations (5A-GLNS) and (5B-GLNS) and employing respective channel-specific de-rotation frequencies for the SIN and COS Generator 810 for the corresponding frequency de-multiplexers. These channel-specific de-rotation frequencies have different frequency values, and in general, these values are different from the single de-rotation frequency fGLNS_IF used in the GLNS de-rotator in FIGS. 2B and 7A. Dotted lines in FIG. 10 indicate the signal paths that contribute to complex de-rotation.

The GLNS section has de-rotations 222, 226 of FIG. 2B that can be rearranged in various ways. One way sets the fGLNS_IF of de-rotation 222 precisely at a particular GLNS satellite frequency, so that it is converted directly to GLNS baseband. Some portions of the GLNS band can be band-passed to subbands and individually handled there. In some cases the fGLN_IF for de-rotation 222 is set half-way between respective pairs of satellites, which are then separated by IQ de-rotation 226 in a way analogous to the process 222 described for the IQ de-rotation that separates GPS from GLNS elsewhere herein.

Embodiments herein for satellite receivers are contemplated to receive and separate these and other GNSS. Such other GNSS may include Beidou-2 (COMPASS, China) code-division satellite signals, IRNSS (Indian Regional Navigational Satellite System 1176 and 2492 MHz), QZSS (Quasi-Zenith Satellite System, Japan, related to GPS), as well as ground-based transmitters and other augmentations. Some augmentations are SBAS, e.g. satellite based augmentation systems like the North American WAAS Wide Area Augmentation, European Geostationary Navigation Overlay Service EGNOS, and Multi-Functional Satellite Augmentation System MSAS relating to east Asia. In the case of Beidou-2 (COMPASS), for instance, the filter chains in FIGS. 7A and 7B described herein for other GNSS are suitably arranged to have filter properties such that COMPASS does not interfere with them, or instead subsequently simply correlate it to zero in correlator 230. Also, some embodiments add a digital signal processing chain to receive COMPASS and are structured and operate in a manner analogous to the digital signal processing chains already described herein for each of Glonass and GPS/Galileo.

Thus, various other embodiments for analogously and inexpensively processing plural-GNSS and other signals may have different frequency bands and ranges, different LO frequency, and different IF and ADC bandwidth than in the examples shown. It is emphasized that the "G" in GNSS is not limiting to only global systems.

Description now returns to FIGS. 5 and 6.

In FIG. 5, a programmable real notch filter 430Q, 430I in the phase compensation path is provided so that symmetric spurs around DC are filtered off and avoid spur-caused biased estimates of gain and phase imbalance. In the IQMC 410 of FIG. 5 and FIG. 6, a gain adaptation section 560 adjusts the amplitude of the quadrature Q signal to match the amplitude of the in-phase I signal, and leaves the in-phase I signal amplitude unchanged. (An alternative IQMC mode instead adjusts the amplitude of the in-phase I signal to match the amplitude of the quadrature Q signal, and leave the in-phase Q signal amplitude unchanged.) Basically, the idea for gain compensation is to accumulate the average squares of I and Q (with DC offset eliminated) and apply gain compensation as a joint function of them. Or, whichever is the signal I or Q for which the average square is less, that signal is multiplied by a gain factor $g_m$ equal to the square root of the ratio of the larger average square to the smaller average square.

Then in FIG. 6, a phase imbalance adaptation section 570 adjusts the phases as shown so they differ by 90 degrees. Phase imbalance compensation and calibration flow 570 is shown in the right hand side of FIG. 6. The mathematical operation for compensating IQ phase imbalance −δ is $$Qout = \frac{Qin}{\cos(\delta)} + \tan(\delta)Iin \qquad (11)$$

The phase of in-phase component $I_{in}$ is left unchanged. Here, $Q_{in}$ is the gain-adjusted quadrature component. The phase imbalance −δ is indirectly estimated as discussed in more detail later hereinbelow by FW using statistics collected by the FIG. 6 HW that produce a register value designated x. FW then computes cos and tan of the phase imbalance compensation angle +δ as a function of x as described next, and programs HW registers appropriately. The phase compensation angle +δ is assumed to be in a range such as [−30, 30] degrees, and so 1/cos(δ) is in a corresponding range [1, 1.1547]. So, FW computes a variable part x=−1+1/cos(δ) (where x is in a range [0, 0.1547]) and accumulates statistics by which x is estimated and registered. A large number of bits could be needed to electronically represent x directly in binary, especially for small fractional values, so a dynamic scaling bit-field d in phase imbalance compensation codes for the number of leading zeroes and is used along with x. The Q signal is multiplied by Q=Q*(1+x/(2^d)). Then in FIG. 6, the I channel signal is multiplied by tan (δ) and the result is then added to the multiplied Q channel signal to supply Qout.

In FIG. 6, a sub-module Choose Samples is provided to take care of impact of signal clipping in ADC on phase imbalance estimate. There, only the samples with magnitude less than a firmware-configured threshold are used for phase imbalance estimation of x.

Further in FIG. 6, a succeeding block uses the samples in Phase Imbalance Estimation. Briefly stated, the operations for statistics collection to support phase imbalance estimation performs an average product of I and Q over time. If I and Q were perfectly in quadrature, that average product would be zero. So the average product is a measure of the phase imbalance sin(−δ). A sample counter counts number of samples being integrated, until reaching e.g. 4096, whence statistics collection stops and a Done flag is raised, and the collection process repeats. If DC offsets $D_i$ and $D_q$ (non-zero mean of I, or non-zero mean of Q) may be included in signals I and Q at the phase imbalance statistics collection point of the process, then the effect of such offsets is reduced or eliminated from the phase imbalance (sin(−δ)) estimation by forming a multiplicative product of offsets $D_i$ $D_q$ and subtracting that product of offsets from the average measured product I*Q.

In FIG. 6, after Phase Imbalance Estimation of sin(−δ), the firmware and hardware are arranged to perform Adaptation of the Phase Imbalance estimate by negating to obtain the value $\sin(\delta)$, the sine of the compensation angle $+\delta$ to eliminate the phase imbalance $-\delta$. The Adaptation block trigonometrically transforms that value into a value of $\tan(\delta)$ and a value for $1/\cos(\delta)$. The trig identities $\cos^2(\delta)=1-\sin^2(\delta)$ and $\tan^2(\delta)=\sec^2(\delta)-1$ are involved here. These are fed to respective multiplications with I and Q shown in FIG. 6 and then the subtraction delivers Qout.

Note that the plus or minus sign of $\delta$ depends on the phase balance specification of quadrature as leading or lagging 90 degrees, so negating or not negating $\delta$ is performed in such manner that the compensation converges to the specified or desired phase balance. The following derivation for $\sin(-\delta)$ is given for one such specification. Assume all the cross products between components with different frequencies in I*Q average to zero and concentrate on products at each same frequency. Heuristically, let such same frequency components be typified by $I=I_a \sin(\omega t)$ and $Q=Q_a \cos(\omega t-\delta)$, where $I_a$ and $Q_a$ represent amplitudes, and the phase imbalance $(-\delta)$ is common to all the components regardless of their angular frequency $\omega=2\pi f$. Combining and using a trig identity and omitting zero-average terms yields Equation (11A):

$$\text{Avg}[I*Q]=\text{Avg}[(D_i+I_a\sin(\omega t))*(D_q+Q_a\cos(\omega t-\delta))]= D_iD_q-0.5I_aQ_a\sin(-\delta) \quad (11A)$$

The amplitudes Ia and Qa are suitably estimated from the root-mean-square (rms) values of I and Q. The amplitude is greater by a factor $\sqrt{2}$ (square root of two) times the rms value of a sine or cosine function. The rms values are $\sqrt{(X_i-D_i^2)}$ and $\sqrt{(X_q-D_q^2)}$ where X represents the mean-square, and D represents the DC average or offset value. Combining with Equation (11A) and solving for $\sin(-\delta)$ yields an Equation (11B) representing one example of electronic process for estimation of phase imbalance based on statistics gathered and averaged by the circuitry 570.

$$\sin(-\delta)=-[\text{Avg}[I*Q]-D_iD_q]/[\sqrt{(X_i-D_i^2)}*\sqrt{(X_q-D_q^2)}] \quad (11B)$$

Some simplified process embodiments can feasibly omit one or more offsets from the process represented by Equation (11B) since the circuits 430, 560 and 570 cooperate with each other and the phase imbalance circuit 570 is basically a negative feedback error correction circuit. For instance, since circuit 430 minimizes the DC offsets Di and Dq and circuit 560 gain-balances the rms values for I and Q, the denominator product in Equation (11B) is reasonably approximated by Equation (11C) using the mean-square of either Iout or Qout.

$$\sin(-\delta)\sim=-G*\text{Avg}[I*Q]/\text{Avg}[I_{out}^2] \quad (11C)$$

Thus, a variety of alternatives are acceptable for the $\sin(-\delta)$ estimation that vary Equation (11B) substantially by a factor, introduce a programmable phase imbalance loop gain factor G and sign, or otherwise are different from Equation (11B) and still permit error-correcting convergence in phase imbalance compensation circuit 570. The compensation can be applied to one or both of the I and Q signals, and is illustratively applied to the Q signal in FIG. 6. The compensation can be applied (with angle $\delta$ reversed in sign) to the I-signal instead. Equivalently, the compensation can be applied in different amounts by forming angles $\delta i+\delta q=\delta$ and applying phase compensations $\delta i$ and $-\delta q$ based on suitable trigonometric operations to the I and Q signals respectively.

That operations to realize the Equation (11) for phase imbalance compensation hereinabove are indeed effective is seen by recognizing that Iin is comprised of frequency components, e.g. $\sin(\omega t)$. The phase imbalance $-\delta$ is the same for each frequency component in the Qin waveform as represented by a corresponding representative quadrature component at the same frequency but phase imbalance $-\delta$ next:

$$\cos(\omega t-\delta)=\sin(\omega t)\sin(-\delta)+\cos(\omega t)\cos(-\delta) \quad (12)$$

Substituting the Iin component $\sin(\omega t)$ and the Qin quadrature component shown in Equation (12) into the phase compensation Equation (11) yields $\cos(\omega t)$, the phase compensated component of Qout.

$$[-\sin(\omega t)\sin(-\delta)+\cos(\omega t)\cos(-\delta)]/\cos(\delta)- \tan(\delta)\sin(\omega t)=\cos(\omega t). \quad (13)$$

Frequency-component-based Equation (13) shows the FIG. 6 adaptation operations providing the desired phase compensation. Since positive and negative signs in the equations and the use of addition or subtraction in the summer can strongly affect the results, an implementation of firmware code and/or hardware for phase compensation should be carefully checked to obtain the correct operation taught and intended herein. Also, the sign of the $\tan(\delta)$Iin term can be made opposite (plus (+), leading to summing instead of subtraction in FIG. 6) depending on whether the quadrature component Q resulting from the LO in FIG. 2A is leading or lagging by 90 degrees relative to the I component.

Returning to FIG. 5, the AGC block 420 and DC Offset block 430 are described next.

AGC: In GPS, because signal power is much lower than receiver noise, total signal+noise power at ADC 140I, 140Q input is dominated by noise power that slowly varies with noise figure and RF front-end gain. If no in-band or close-in jammers are present, AGC 420 has less to do. In-band jamming in GPS band can occur if a transmitter of any of e.g. GSM, WCDMA, WiMAX, or Bluetooth transmits wideband noise in GPS band, power level of which can be higher than GPS receiver noise. Or reference spurs can leak into GPS LNA 160 input. In such a case, AGC 420 estimates in-band signal power and reduces gain in VGA 130I, 130Q and keeps the IF from saturating. In case of a spur, because over-all peak to average ratio (PAR) decreases, it is possible to increase the ADC 140I, 140Q set-point by an amount equal to decrease in PAR due to presence of spur. AGC estimates signal power and PAR and sets the radio gain by comparing the measured data with programmed value of ADC setpoint. AGC 420 changes the VGA 130I, 130Q gain. Absolute value of AGC estimation error should be low. Register bit fields set various modes.

AGC is frozen/disabled in an External PA Blanking mode. The PA blanking signal comes to the GPS core as an external signal, and the same signal is routed to AGC 420 as an interrupt. When asserted, it causes AGC to reset itself, and program the radio 210 with programmable or pre-defined gains. When this interrupt is de-asserted, AGC programs the radio with gain same as radio gain prior to External PA Blanking and starts operation afresh.

In an AGC Freeze Mode, AGC and radio gain are frozen to their current values when this register bit is asserted. When it is de-asserted, all AGC 420 accumulators are reset and fresh integration window (I, Q accumulation) started after one blanking interval. In an Inband_Jammer_Detect mode, AGC 420 detects the presence of an in-band jammer by comparing estimated signal power with nominal noise floor of the receiver calibrated by the AGC itself, with help from firmware. In an Inband_Spur_Detect mode, AGC 420 estimates the PAR of the combined signals at ADC input. Spur output is detected by comparing PAR with a programmable threshold. In a Nominal Noise-Floor Calibration mode, the AGC loop helps a firmware module calibrate the nominal noise floor of the receiver.

A set of core accumulators support AGC 420 operations by accumulating each of I, Q, I-squared, and Q-squared over a number Ncore of ADC 140I, 140Q samples. The respective outputs of the accumulators are designated Mi, Mq, Pi, Pq, and used by subsequent AGC 420 logic on ADC clock 145 divided by 8 along with Ncore. Ncore corresponds to number of samples, e.g. 8 hard-coded, accumulated in the core accumulators.

A second level of accumulators for inband jammer detection accumulates the outputs of the Core Accumulators (Pi, Pq, Mi and Mq) over a number of values NIJD that can be 2N, N ranges from 0 to 10. Therefore, total 8NIJD ADC output samples are effectively used for computing IJD accumulator outputs.

Separately, analogous gain control GC accumulators control the gain in radio by selecting radio gain and sending a gain control word to radio. Then AGC blanking starts. These are multiples of NIJD for synchronization of gain control operations and in-band jammer detection. During AGC blanking, none of the accumulators (core, IJD or GC) run.

Signal power estimation logic in AGC 420 is applied on gain control output at the end of every NgcNIJDNcore number of ADC samples. The same logic is applied on IJD accumulator output at the end of every NIJDNcore number of ADC samples. The difference is that in case of GC accumulators, the computed signal power is used for setting the radio gain, while in case of IJD accumulators it is used for detecting in-band jammers using just a comparator.

The radio gain selection logic in AGC 420 consists of hardware for computing root mean squared (RMS) amplitude of signal input to AGC (and therefore ADC), followed by computation of log 2(.) of the RMS amplitude. The RMS amplitude in log domain is then used for selecting gain. First, the accumulators are divided by number of samples to get average signal power. The division is trivial as number of samples is a power of 2. The following equations apply as shown when GC accumulator outputs are used. When IJD accumulators are used, NGC in the denominator of the following equations (14, 15, 16, 17) is absent.

$$X_i = \frac{P_{GC,i}}{N_{GC}N_{IJD}N_{core}}$$

$$X_q = \frac{P_{GC,q}}{N_{GC}N_{IJD}N_{core}}$$

$$D_i = \frac{M_{GC,i}}{N_{GC}N_{IJD}N_{core}}$$

$$D_q = \frac{M_{GC,q}}{N_{GC}N_{IJD}N_{core}}$$

(14, 15, 16, 17)

After that, signal power is calculated in Equations (18) and (19) as follows:

$$Q = X_i - D_i^2 + X_q - D_q^2$$

$$Q_{dB} = \log_2(Q)$$

(18, 19)

The squaring operation can utilize the multipliers or multiplication operations that are used for squaring ADC output. Since DC offsets $D_i$ and $D_q$ can exist and the square of each of them is respectively included in $X_i$ and $X_q$ even after the X accumulations, Equation (18) subtracts out those squares $D_i$ and $D_q$. The signal power is obtained in Equation (18) by summing $X_i$ and $X_q$ which are the squares of the I, Q components, with effect of DC offsets $D_i$ and $D_q$ removed. The $\log_2$ operations bring out a quantity proportional to dB. The $\log_2$ operations are digitally executed and LUT-based, and they map between an RF gain codeword used in RF and the one used in AGC 420 for VGAs 130.

The in-band jammer detection logic for AGC 420 estimates received signal power using IJD accumulator outputs, and it compares the estimated power with one or more blanking thresholds. Each blanking threshold is calibrated by firmware and programmed into appropriate registers. If presence of jammer is detected, then a signal line AGC_Inband_Jammer_Detection is set active high. This signal goes out of AGC block to a block for Level Monitor associated with the Slicer blocks in each of the GPS and GLNS paths.

As part of in-band jammer detection embodiment or example, two such blanking thresholds are used: AGC_Auto_Blank_Threshold_ON and AGC_Auto_Blank_Threshold_OFF. Firmware computes these two thresholds using help from hardware. The following logic provides this help to FW. Recall that signal power is estimated by Equations (14)-(19) using gain control accumulators for every $N_{gc}N_{IJD}N_{core}$ number of ADC samples. The blanking threshold determination logic computes the minimum MIN and the maximum MAX of this estimated power over a window of time. The blanking threshold determination logic continues to compute MIN and MAX until those MIN and MAX values are read by firmware, upon which event computation MIN and MAX is restarted.

Figure 11:
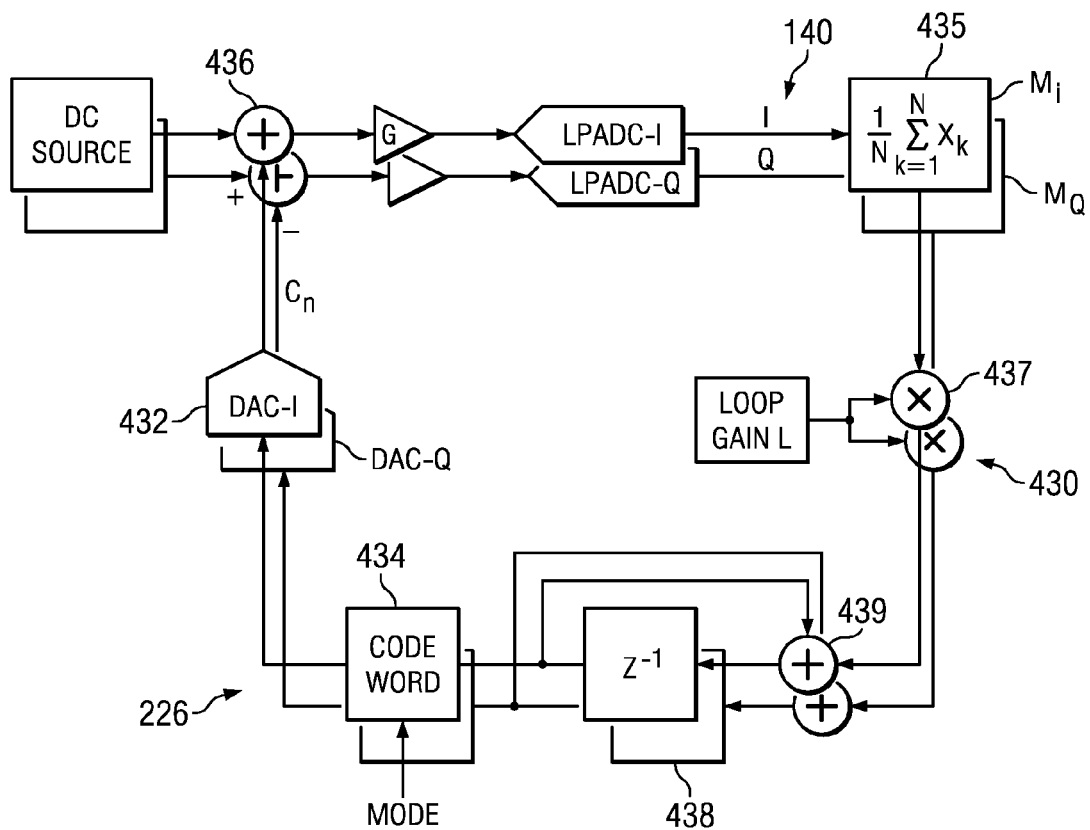
FIG. 11 is a further more-detailed block diagram detailing an inventive DC Offset section in the inventive Common Part section of FIG. 5.

In FIG. 11, turning to the subject of DC offset, a DC offset module 430 or engine takes output of the 5-bit pipeline ADC (each analog to digital converter LPADC 140I, 140Q of FIGS. 2A-3B) as input, and calibrates (corrects) DC correction DACs 432 (digital to analog converters) in the closed loop 226 of the system by sending them respective digital codewords 434 that act as controls for the DACs 432. In other words, the average value $M_i$ of the I signal should be essentially zero (no DC component), and likewise the average value $M_q$ of the Q signal should be zero coming out of its LPADC. If not, a DC offset or error exists as if from a DC source and is detected by averages 435 and needs to be canceled out. A control loop for such cancellation has a programmable loop gain provided by multiplications 437 of the current averages $M_i$ and $M_q$ 435, which results then are fed to respective accumulators formed by respective register-summer pairs 438I, 439I and 438Q, 439Q to form the digital codewords 434. An error-compensating analog voltage for I or Q is generated by such DAC 432 in response to a digital value (codeword) 434 supplied thereto, and subtractively summed by a respective ADC input summer 436 with whatever VGA 130I, 130Q output voltage is provided, to deliver the respective summed voltage as the VIN input to corresponding LPADC 140I, 140Q in FIG. 3A and FIG. 11. The DC offset module 430 performs this task.

Figure 12:
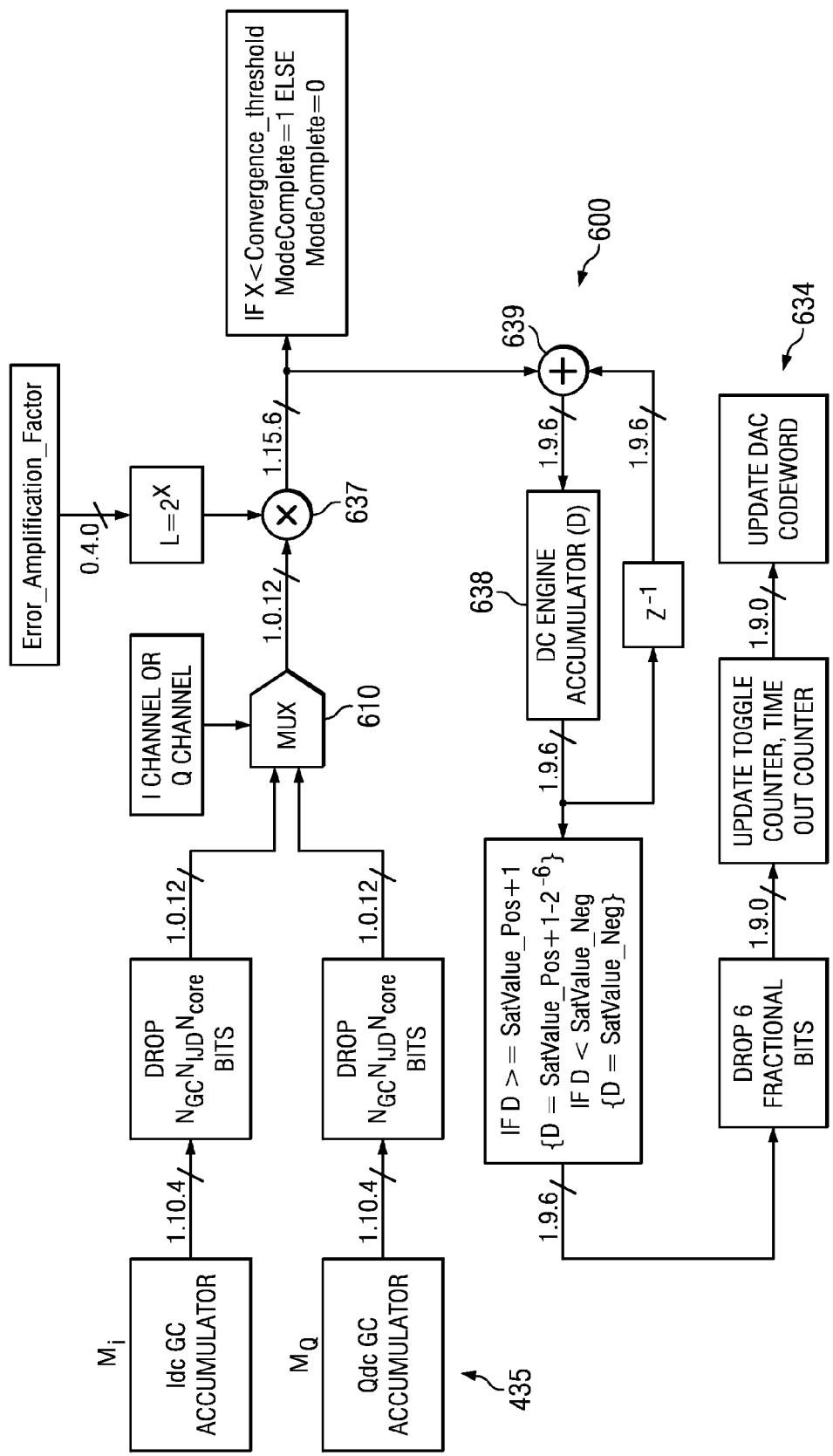
FIG. 12 is a partially-block, partially-flow diagram detailing an inventive Calibration Mode for use with the inventive DC Offset section of FIG. 11.

The core DC calibration process in the FIG. 11 hardware for DC offset 430 is controlled in FIG. 12 by a DC state machine 600 in software. DC offsets engine 430 of FIG. 11 has parallel independent paths to calibrate (correct each codeword) for the respective DAC-I and DAC-Q in DAC 432. Correction is provided over a wide range of possible errors $M_i$ and $M_q$ 435 using a programmable process of FIG. 12 wherein software of DC state machine 600 controls and sequences operation of DC offsets engine 430. In this way, the software-based DC state machine 600 in the Calibration Mode of FIG. 12 calibrates or establishes each DC correction value (codeword) 434 as a starting point for subsequent Steady State Mode control of each DAC 432 in the radio.

In FIG. 12, the DC engine state machine 600, in a Calibration Mode process embodiment, selects by selection 610 a given one of the DACs 432 in radio and calibrates it by a closed loop adaptive process and a linear search. The 6xx digits of FIG. 12 Calibration Mode are labeled for comparison and further detail of corresponding controlled parts 4xx of FIG. 11. In this Calibration mode, the FIG. 5 AGC 420 is disabled and FIG. 2A VGA 130 gain is controlled or stabilized by firmware FW so that the DC engine 430 is unaffected by VGA 130 gain variation as it calibrates the selected DAC 432. The selected DAC in 432 suitably includes a Coarse DAC and a Fine DAC that are jointly calibrated. Since AGC 420 is disabled, the IJD and GC accumulators described for AGC 420 earlier hereinabove are suitably re-used for DC offset 430, 600 purposes. Blanking is useful during Calibration Mode as well. After each DAC codeword 434 is calculated and updated by post-accumulation control steps 634, blanking is applied so that ADC samples are ignored for some time before fresh DC estimation 435 starts. Duration of the blanking is indicated by a programmable register also used to program blanking durations during AGC operations.

Figure 13:
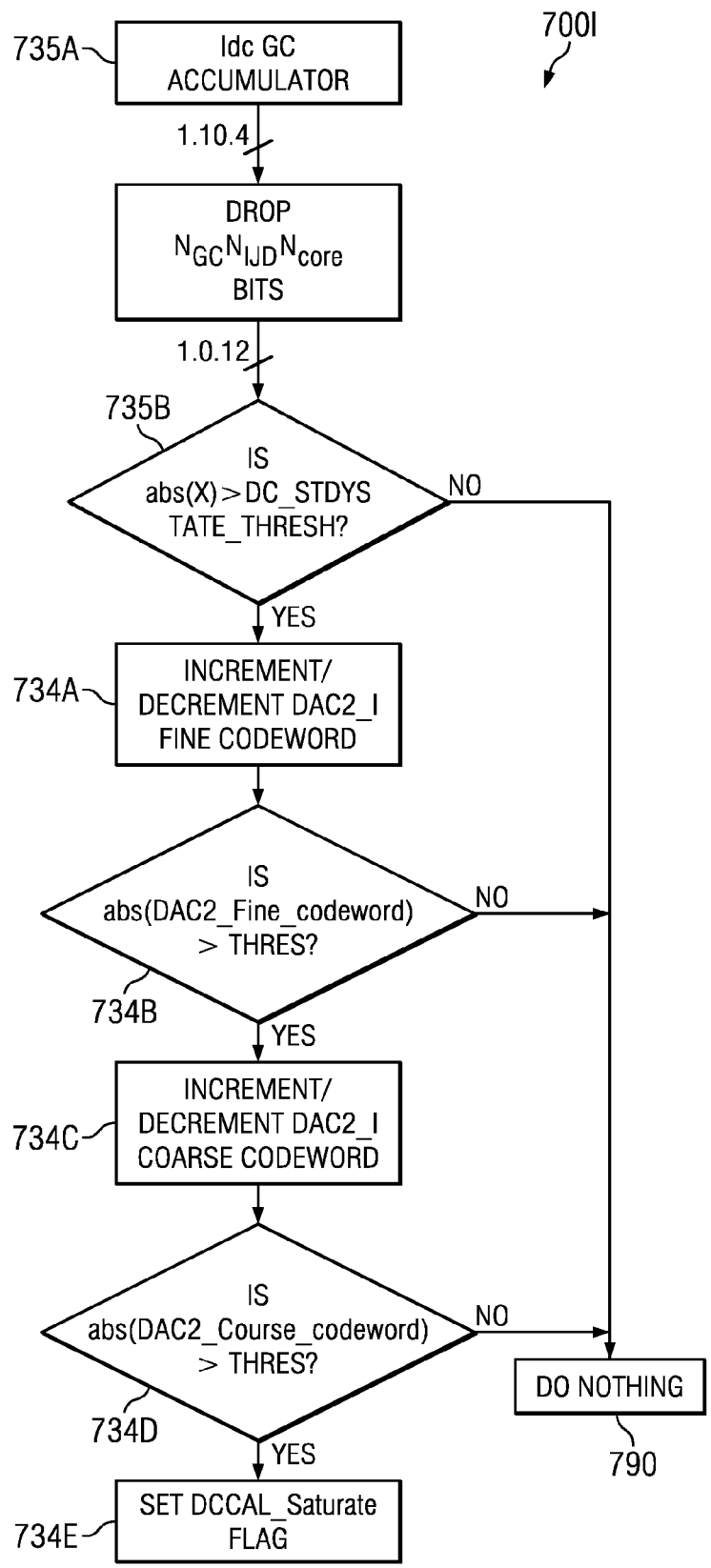
FIG. 13 is a partially-block, partially-flow diagram detailing an inventive Steady State Mode for use with the inventive DC Offset section of FIG. 11.

FIG. 13 depicts a process embodiment for a Steady State Mode 7001 wherein the DC offsets engine 430 of FIG. 11 tracks average value $M$ of the I signal and average value $M_q$ of the Q signal and then revises the DAC-I and DAC-Q codewords 434 to compensate slowly changing DC offsets D for each I or Q channel in regular post-calibration receiver operation. For simplicity, only the I signal control path 700I for Steady State Mode is illustrated. The Q signal control path 700Q is parallel and analogous to that for the I signal path 700I and therefore not shown.

In the loop of FIGS. 11 and 12, an embodiment for calibrating/adapting a DAC 432 cancels out an initially unknown value of DC offset D as if coming out of a DC source (even though the offset may arise from LPADC 140I or Q, for instance.) Let the DAC 432 output at integration time instant n be designated G. Then residual DC at an amplifier G input is $D-C_n$, and at the input of ADC 140I or Q is $G(D-C_n)$. Denote the scaling between ADC 140I or Q input voltage and ADC output digital word as $G_{adc}$. Therefore, residual DC at ADC output is given by $G_{adc}G(D-C_n)$. The moving average accumulator 435 value $M_i$ or $M_q$ for estimating residual DC is treated as having no estimation error (unbiased and sufficient accumulations). Accordingly, the moving average accumulation times a loop gain L is $LG_{adc}G(D-C_n)$.

If no DC correction were applied, then $C_n=0$. In that case, the residual DC after loop gain=$LG_{adc}GD$. The scaled residual DC estimate is added to previous DC correction codeword 434, and previous codeword in this case is zero, so the new correction codeword will be $C_{n+1}=LG_{adc}GD$. Let a scaling factor $G_{dac}$ relate DAC 432 output analog voltage $C_n$ to its DAC input codeword 434. Then the DC correction voltage is $C_n=G_{dac}LG_{adc}GD$. Ideally, this correction is identical to D. Then the ideal value for the loop gain L at multiplier 437 is given by Equation (20):

$$Lideal = \frac{1}{G_{dac}G_{adc}G} \quad (20)$$

Given the values of gain of the amplifier G, ADC, and DAC, the DC offset could be estimated and corrected in one iteration, as above. Of course, the gains are only known with some error. Denote a chosen loop gain as L. As long as $L/L_{ideal}<2$, the adaptive DC correction loop converges to the optimal codeword using adaptation equation (21):

$$D_{n+1}=D_n+Ld_n \quad (21)$$

$D_{n+1}$ signifies the DAC codeword in (n+1)-th integration window, and $d_n$ is the estimate of residual DC at the end of n-th integration window. Denoting a normalized loop gain ratio $a=L/L_{ideal}$, the DC correction at after n-th integration window (assuming that adaptation stated at n=1) is $[1-(1-a)^n]D$. If a is close to 1, then for an acceptably moderate number n, DC correction $D_{n+1}$ due to accumulation 438, 439 becomes essentially equal (converges) to the unknown actual DC offset D. The DC calibration loop of FIG. 11 converges monotonically to the optimal DAC codeword by selecting a value of L so that loop gain ratio $a=LGG_{adc}G_{dac}$ is less than 1. To facilitate convergence, L is suitably underestimated by overestimating G somewhat.

Operations negate the coarse and fine codewords depending on a configuration bit to assure the loop has negative feedback. The codeword is converted to offset binary representation if a configuration bit is set. The codeword is generated with a width sufficient to drive, for example, one 6-bit coarse DAC and a 4-bit fine DAC jointly acting as a 10-bit DAC.

In FIG. 12, a toggle counter counts a number of consecutive adaptation cycles where DAC codeword 434 is toggling between neighboring codewords (n and n+1, for example). If comparison detects that the toggle counter is more than toggle threshold, then convergence is declared and adaptation stops. A timeout counter is used for timing out the calibration loop in case of non-convergence.

In FIG. 13, the process 7001 for Steady State Mode of the FIG. 11 DC offsets engine 430 is enabled and executed. By this point, Calibration Mode 600 of FIG. 12 has calibrated the DACs 432. Now Steady State Mode in FIG. 13 is used for finer tracking of DC offset D. In Steady State Mode, the process 700I has the following steps. Note the process is executed independently respective to the I and Q DACs 432 as indicated in FIGS. 11 and 13. The 7xx digits of FIG. 13 Steady State Mode are labeled for comparison with corresponding controlled parts 4xx of FIG. 11.

1. When enabling the steady state mode 700I, 700Q of DC offset 430, firmware also enables AGC 420. If AGC is nevertheless programmably disabled, all the accumulators (core, IJD and GC) run, except that the radio gain determination does not run. IJD logic runs, unless disabled.
2. DC offset is estimated at a step 735A using the gain control accumulators.
3. If the DC offset estimated at step 735A is less than a programmable threshold at a step 735B, then take No Action to point 790. Go back to step 1, else if not less than threshold, go to step 4.
4. DC offset is higher than programmable threshold. In a step 734A, increment or decrement the DAC_i_Fine codeword (respective to i=I or Q) by 1 LSB depending on sign of the residual DC estimated at step 735A. If DAC_i_Fine codeword is not saturated as determined by a decision step 734B, then the thus-adjusted Fine codeword controls the respective DAC 432 and operations in FIG. 13 go back to step 1. If DAC_i_Fine codeword is saturated at step 734B, then proceed to step 5.
5. Depending on the sign of DAC_i_Fine codeword, increment or decrement DAC_i_Coarse codeword at a step 734C. Also in step 734C, reduce the magnitude of DAC_i_Fine codeword by DAC_i_Resolution_Ratio, which is the ratio of LSB of DAC_i_Coarse and DAC_i_Fine. If DAC_i_Coarse is saturated as determined by a decision step 734D, then go to step 7, else, go to step 6.
6. Write the updated DAC2 codewords to the DC offset table and operations go to step 1, following which the hereinabove-described FIG. 13 loop operations automatically seek and find satisfactory Fine and Coarse codewords.

7. Step 734E sets a FIG. 13 DCCAL Saturate flag and sends a Fresh_DC_Calibration Request to GPS processor. Stay at step 7 awaiting a reply Interrupt signifying execution of Calibration Mode 600 of FIG. 12 and any gain revisions by AGC 420.
8. Upon Interrupt, if VGA 130 AGC gain changes or RF gain changes (in any of FIG. 2A blocks 160, 170, 120) as indicated such as by AGC 420, then DC offset table is read, and new values DAC_I_Coarse, DAC_I_Fine, DAC_Q_Coarse, DAC_Q_Fine are loaded as the latest codewords 434 to DC correction registers for them. Fresh integration is started by resetting all the internal DC offset accumulators. Operations return to step 1.

The above FIG. 13 operations of steps 1-7 as described continue as long as VGA gain or RF gain is not changing. When the AGC 420 circuitry in FIG. 5 signals for a change in VGA gain (e.g. new value G in FIG. 11), then Steady State Mode 700 for the DC offsets engine 430 reloads DAC_i_I and DAC_i_Q codewords from a DC calibration table indexed by VGA gain.

In summary, Steady State Mode 700 updates the DAC_I and DAC_Q codewords every AGC integration cycle. If VGA gain changes, then a codeword 434 corresponding to the new gain is read from the VGA-gain-indexed DC calibration table and loaded into the applicable DAC_I or DAC_Q register. Before VGA gain changes further, then the residual DC is compared with a threshold (e.g., at step 735B) and the Steady State Mode process listed above and shown in FIG. 13 operates to update the DAC_I and DAC_Q codewords. The updated DAC_I and DAC_Q codewords are written back to the DC calibration table to keep it accurate.

This completes description of FIGS. 5, 11, 12, and 13.

Detection and testing of the multiple-GNSS receiver are relatively practical and convenient. In testing, the LO frequency fLO is wirelessly or capacitively coupled to a frequency measuring device to confirm that the LO frequency is established approximately midway between the GPS and Glonass bands. The single receive architecture is physically inspected by microscopic observation of the device. Moreover, the multiple-GNSS performance supported by the single antenna and single SAW filter at platform level also indicate use of the multiple-GNSS front end. Injection of simulated satellite signals in two different GNSS bands excites the receiver to provide position information based on them together.

A variety of multi-band receiver embodiments are provided for spread-spectrum and FDM and other communications systems in multiple bands at base stations, gateways, handsets, and any applicable devices for mobile, portable, and/or fixed use. Such systems suitably support any one or more of global positioning systems GPS, Galileo, Glonass, Beidou-2 (COMPASS), and other location-determining or positioning systems, cellular voice and data, code division multiple access CDMA, wireless local area network WLAN, industrial, scientific, and medical communications, cordless telephones, and any other spread-spectrum or other communications systems.

For example, Beidou-2 (COMPASS) is suitably added by adding a digital signal chain for it analogous to the teachings herein for other GNSS. If COMPASS is not thus added, its satellite signals are buried under the noise floor and hence are unlikely to cause interference even if present.

A system embodiment architecture is carefully checked to avoid or reject any interferers that might reasonably occur in the FIG. 1 frequency spectrum between GPS/Galileo and GLONASS, such as harmonics and spurs caused by other radios and clock oscillators on or off chip. For example, Bluetooth clock could potentially generate a spur around 1.6 GHz. Harmonics of some reference frequency (e.g. 13 MHz) of a crystal 104 or of on-chip dc-dc power circuitry could fall in this frequency range. The embodiments of structure and process that are architected and operated as described elsewhere herein according to jammer/spur AGC controls and the various non-AGC features provided are believed sufficiently robust to avoid or handle various, most or all such interference scenarios.

Other embodiments described next and patterned after FIG. 2A remarkably employ a narrower, approximately 10 MHz IF bandpass or less to encompass, confine and overlap both GPS/Galileo and Glonass in the I-Q IF sections. Desirably, no polyphase filters are involved, and the amounts of RF circuitry and IFA-VGA-LPADC circuits remain unchanged compared to FIG. 2A. Some such embodiments may also economically use a single LPADC of FIG. 3D time-multiplexed between the two IF sections to deliver the GNS_I and GNS_Q outputs in FIG. 2A, such as when the narrower IF passbands are used hereinbelow or when economical in any of the embodiments described hereinabove.

In such other embodiments, the sampling rate Fsamp is selected as some rate (e.g., 2.5 to six (6) or more times the narrower IF bandpass) in excess of Nyquist rate (2×) and high enough to make the subsequent de-rotation and low-pass filtering reasonably simple. In FIG. 2, the LO (designate it LO1) is situated at a frequency somewhere in a range from about 1578 to 1584 MHz (above GPS/Galileo). An additional, second pair of IQ mixers fed by the RF circuit has its own second quadrature LO2 situated at about 1596 or 1597 MHz (below Glonass). (A 16.8 MHz TCXO of TABLE 2 feeding 94× and 95× integer multiplications can provide such a pair of LO1, LO2 frequencies at 1579.2 MHz and 1596 MHz respectively.) As thus provided in such type of embodiment, the in-phase mixers I from the mixer pairs are summed and fed to the IFA-I path in FIG. 2A. The quadrature mixers Q from these mixer pairs are summed and fed to the IFA-Q path, also in FIG. 2A. Each IF section and its ADC establishes an IF passband with a cutoff frequency approximately 10 MHz or so, and expressed more generally by MAX[(1606.4−fLO2), (fLO1−1573.4)]. The mixer circuitry injects the RF-non-overlapped GPS and Glonass into the IF passband and substantially overlaps them with each other. When using LO1 and LO2, sufficient digital low pass filtering LPF is applied after digital de-rotation. That subsequent LPF process has a cutoff frequency situated at a suitable frequency in a reduced frequency gap of 19.6 MHz−(fLO2−fLO1) between GPS and GLNS, compared with the 19.6 MHz gap (1597−1577.4=19.6) when a single LO is used in FIG. 2. The LO2 and LO1 are suitably kept from cross-mixing with each other, and any cross-mixing difference-product (fLO2−fLO1) is kept high enough in frequency to lie outside the IF passband of the IF sections and be rejected.

Injection and overlap of GPS and Glonass into the IF passband can alternatively or also be established by using a first LO frequency fLO1 somewhere in a range from about 1563 to 1573 MHz (below GPS/Galileo) and a second LO frequency fLO2 situated at about 1607 or 1608 MHz (above Glonass). The IF passband is MAX[(1577.4−fLO1), (fLO2−1597)] in this type of embodiment. As above, when using LO1 and LO2, sufficient digital low pass filtering LPF is applied after digital de-rotation. That subsequent LPF process here has a cutoff frequency situated at a frequency in a gap given by (fLO2−fLO1)−33 MHz between GPS and GLNS in this alternative embodiment (1606.4−1573.4=33 MHz), compared with the 19.6 MHz gap (1597−1577.4=19.6) when a single LO is used in FIG. 2A.

Regarding the IF passband width, some embodiments may even provide as narrow as approximately a 5 MHz IF passband by deliberately filter-rejecting some of the Glonass channels, or switching LO frequencies between the LO frequency selections mentioned above to collectively or compositely obtain all the Glonass channels. These narrow-passband embodiments can provide additional noise rejection and out-of-band jammer/spur protection that may also justify the extra LO and mixer circuitry.

Various embodiments are used with one or more microprocessors, each microprocessor having a pipeline is selected from the group consisting of 1) reduced instruction set computing (RISC), 2) digital signal processing (DSP), 3) complex instruction set computing (CISC), 4) superscalar, 5) skewed pipelines, 6) in-order, 7) out-of-order, 8) very long instruction word (VLIW), 9) single instruction multiple data (SIMD), 10) multiple instruction multiple data (MIMD), 11) multiple-core using any one or more of the foregoing, and 12) microcontroller pipelines, control peripherals, and other microcontrol blocks using any one or more of the foregoing.

Various embodiments are implemented in any integrated circuit manufacturing process such as different types of CMOS (complementary metal oxide semiconductor), SOI (silicon on insulator), SiGe (silicon germanium), organic transistors, and with various types of transistors such as single-gate and multiple-gate (MUGFET) field effect transistors, and with single-electron transistors, and other nanoelectronics and other structures. Photonic integrated circuit blocks, components, and interconnects are also suitably applied in various embodiments.

Various embodiments of integrated circuit systems and processes as described herein are manufactured according to a suitable process of manufacturing that prepares analog hardware design data, digital RTL (register transfer language) and netlist and/or other integrated design information for a desired embodiment such as one including, or respectively including, one or more integrated circuits as described herein. Such an embodiment is verified in simulation electronically on the RTL and netlist. Place and route operations are performed to establish the physical layout of each integrated circuit, and the layout is verified. In this way, the contents and timing of the memory, of the receiver and processor hardware and of the multiple-GNSS front end are verified. The operations are verified pertaining to the multiple-GNSS receptions and other operations of the communications unit and the GPS/Galileo/GLNS unit as described. Verification evaluation determines whether the verification results are currently satisfactory and the verified design of integrated circuit chips and such other structures as form an embodiment herein is fabricated in a wafer fab and packaged to produce resulting manufactured integrated circuit(s). First-silicon and production samples are verified such as by using scan chain and tracing methodology on the hardware until the chips are satisfactory. A printed wiring board (PWB) of a system embodiment uses the integrated circuit(s). Software and parameters as described in the various Figures herein are analogously coded and verified and loaded into flash or other nonvolatile memory for the system and verified. The system is powered up, and position-fix operations are verified on satellite simulations and with actual satellite reception with various signal powers and urban canyon scenarios.

Aspects (See Explanatory Notes at End of This Section)

Notes: Aspects are description paragraphs that might be offered as claims in patent prosecution. The above dependently-written Aspects have leading digits and may have internal dependency designations to indicate the claims or aspects to which they pertain. The leading digits and alphanumerics indicate the position in the ordering of claims at which they might be situated if offered as claims in prosecution.

A few preferred embodiments have been described in detail hereinabove. It is to be understood that the scope of the invention comprehends embodiments different from those described, as well as described embodiments, yet within the inventive scope. Specific values pertaining to particular systems have been used by way of example and not of limitation, and the embodiments are applicable to GNSS and other systems in general. Microprocessor and microcomputer are synonymous herein. Processing circuitry comprehends digital, analog and mixed signal (digital/analog) integrated circuits, ASIC circuits, FPGAs, PALs, PLAs, decoders, memories, non-software based processors, microcontrollers and other circuitry, and digital computers including microprocessors and microcomputers of any architecture, or combinations thereof. Internal and external couplings and connections can be ohmic, capacitive, inductive, photonic, and direct or indirect via intervening circuits or otherwise as desirable. Implementation is contemplated in discrete components or fully integrated circuits in any materials family and combinations thereof. Various embodiments of the invention employ hardware, software or firmware. Process diagrams and block diagrams herein are representative of flows and/or structures for operations of any embodiments whether of hardware, software, or firmware, and processes of manufacture thereof.

While this invention has been described with reference to illustrative embodiments, this description is not to be construed in a limiting sense. Various modifications and combinations of the illustrative embodiments, as well as other embodiments of the invention may be made. The terms "including", "includes", "having", "has", "with", or variants thereof are used in the detailed description and/or the claims to denote non-exhaustive inclusion in a manner similar to the term "comprising". It is therefore contemplated that the appended claims and their equivalents cover any such embodiments, modifications, and embodiments as fall within the true scope of the invention.

What is claimed is:

1. A wireless receiver for multiple frequency bands reception comprising:
    a single receive radio frequency (RF) circuit having an RF bandpass substantially confined to encompass at least two non-overlapped such frequency bands at RF;
    a single in-phase and quadrature (approximately I, Q) pair of intermediate frequency (IF) sections having an IF passband; and
    a mixer circuit including an in-phase and quadrature (I,Q) pair of mixers fed by said RF circuit and having a local oscillator with in-phase and quadrature outputs coupled to said mixers respectively, said mixer circuit operable to inject and substantially overlap the at least two non-overlapped frequency bands with each other into the IQ IF sections in the IF passband, the IF passband substantially confined to a bandwidth encompassing the thereby-overlapped frequency bands.

2. The wireless receiver claimed in claim 1 further comprising a digital circuit operable to provide separation of the thereby-overlapped frequency bands by complex de-rotation responsive to both said IF sections so that the substantial frequency overlap of said frequency bands with each other in the IF passband is overcome digitally.

3. The wireless receiver claimed in claim 2 wherein said digital circuit is also operable to introduce phase imbalance compensation to provide signals substantially in quadrature prior to the complex de-rotation.

4. The wireless receiver claimed in claim 2 further comprising an analog-to-digital converter circuit (ADC) having paths coupled to said IQ IF sections respectively and providing an outputs potentially having respective DC offsets and wherein said digital circuit is also operable to cancel each such DC offset via a closed control loop with said ADC prior to said complex de-rotation.

5. The wireless receiver claimed in claim 1 further comprising a digital circuit operable with programmable complex de-rotation responsive to the overlapped frequency bands in both said IF sections and followed by low pass filtering, whereby to provide separate first frequency band and second frequency band signals.

6. The wireless receiver claimed in claim 1 further comprising a multiple-path pipelined analog-to-digital converter circuit (ADC) between said IQ IF sections and said digital circuit.

7. A satellite receiver for multiple global navigation satellite systems (GNSS) comprising:
a single receive radio frequency (RF) circuit having an RF bandpass substantially confined to encompass at least two GNSS at RF;
a single in-phase and quadrature (IQ) pair of intermediate frequency (IF) sections having an IF passband; and
a mixer circuit including an in-phase and quadrature (IQ) pair of mixers fed by said RF circuit and having a local oscillator with in-phase and quadrature outputs coupled to said mixers respectively, said mixer circuit operable to inject and substantially overlap two non-overlapped GNSS with each other into the IQ IF sections in the IF passband, the IF passband substantially confined to a bandwidth encompassing the thereby-overlapped GNSS.

8. The satellite receiver claimed in claim 7 wherein the bandwidth of the IF passband is approximately 17-20 MHz wide or less.

9. The satellite receiver claimed in claim 7 wherein said local oscillator is the only local oscillator in said mixer circuit and has a frequency that is between about 1584 MHz, and about 1593 MHz.

10. The satellite receiver claimed in claim 7 further comprising an analog-to-digital converter (ADC) circuit respectively fed by said single in-phase and quadrature (IQ) pair of IF sections.

11. The satellite receiver claimed in claim 10 further comprising a sampling rate circuit coupled to actuate said ADC circuit at a sampling rate between about thirty-four and eighty million samples per second (34 Msps-80 Msps).

12. The satellite receiver claimed in claim 10 further comprising a digital circuit fed by said ADC circuit and operable to introduce phase imbalance compensation to provide quadrature digital signals, each supplying both overlapped GNSS.

13. The satellite receiver claimed in claim 10 further comprising a digital circuit operable to provide GNSS separation by complex de-rotation responsive to both said IF sections via said ADC circuit so that the substantial frequency overlap of said GNSS with each other in the IF passband is overcome digitally.

14. The satellite receiver claimed in claim 13 wherein the complex de-rotation is substantially represented by $$\begin{bmatrix} Iout(n) \\ Qout(n) \end{bmatrix} = \begin{bmatrix} \cos(\Phi(n)) & -\sin(\Phi(n)) \\ \sin(\Phi(n)) & \cos(\Phi(n)) \end{bmatrix} \begin{bmatrix} Iin(n) \\ Qin(n) \end{bmatrix}$$

and $\Phi(n)$ substantially represents $2\pi(f/Fs)n$, where f is a frequency in the IF passband adequate to recover a particular GNSS, Fs is an ADC sampling frequency, and n enumerates samples.

15. The satellite receiver claimed in claim 7 further comprising a digital circuit operable with complex de-rotation responsive to the overlapped GNSS in both said IF sections and followed by low pass filtering, whereby to provide separate first-GNSS and second-GNSS signals.

16. The satellite receiver claimed in claim 15 wherein said digital circuit is also operable to introduce phase imbalance compensation to provide quadrature signals prior to said complex de-rotation.

17. A process of operating a wireless receiver for multiple frequency bands reception comprising:
substantially confining an RF bandpass to encompass at least two non-overlapped such frequency bands at RF;
injecting and substantially overlapping the at least two non-overlapped frequency bands with each other into an in-phase and in-quadrature IF passband; and
confining the IF passband to encompass the thereby-overlapped frequency bands.

18. The process claimed in claim 17 further comprising complex de-rotating the confined in-phase and in-quadrature IF passband so that the substantial frequency overlap of said frequency bands with each other in the IF passband is overcome.

19. The process claimed in claim 18 further comprising phase imbalance compensating the confined in-phase and in-quadrature IF passband output prior to the complex de-rotation.

20. The process claimed in claim 18 further comprising analog-to-digital converting in-phase and in-quadrature outputs resulting as aforesaid, and prior to the complex de-rotating.

21. The process claimed in claim 20 wherein the in-phase and in-quadrature outputs potentially have respective DC offsets and the process further comprising providing a negative feedback control to cancel each such DC offset prior to the complex de-rotation.

22. The process claimed in claim 17 further comprising programmably complex de-rotating responsive to the overlapped frequency bands and then low pass filtering, thereby to separate signals from the first frequency band and second frequency band.

23. The process claimed in claim 17 wherein the overlapped frequency bands include two non-overlapped GNSS frequency bands at RF.

24. The process claimed in claim 17 further comprising establishing an access rate and respective distinct phase increments applicable to the frequency bands, and programmably executing complex de-rotation using the access rate and distinct phase increments approximately concurrently.

25. The process claimed in claim 24 further comprising programmably low pass filtering on the complex de-rotation resulting at the access rate and respective distinct phase increments, whereby to deliver signals separated from each other from the overlapped frequency bands.

26. The process claimed in claim 17 further comprising digital signal processing the confined IF passband to deliver a receiver position estimation.

* * * * *